(12) United States Patent
Moore

(10) Patent No.: US 10,846,255 B2
(45) Date of Patent: Nov. 24, 2020

(54) APPARATUS AND METHODS FOR DYNAMIC ROLE SWITCHING AMONG USB HOSTS AND DEVICES

(71) Applicant: MCCI Corporation, Ithaca, NY (US)

(72) Inventor: Terrill M. Moore, Trumansburg, NY (US)

(73) Assignee: MCCI Corporation, Ithaca, NY (US)

( * ) Notice: Subject to any disclaimer, the term of this patent is extended or adjusted under 35 U.S.C. 154(b) by 0 days.

(21) Appl. No.: 16/048,019

(22) Filed: Jul. 27, 2018

(65) Prior Publication Data

US 2018/0336151 A1 Nov. 22, 2018

Related U.S. Application Data

(63) Continuation of application No. 15/724,677, filed on Oct. 4, 2017, now Pat. No. 10,585,832, which is a
(Continued)

(51) Int. Cl.
*G06F 13/40* (2006.01)
*G06F 13/38* (2006.01)
*G06F 13/42* (2006.01)

(52) U.S. Cl.
CPC ........ *G06F 13/4022* (2013.01); *G06F 13/382* (2013.01); *G06F 13/426* (2013.01);
(Continued)

(58) Field of Classification Search
CPC ............. G06F 13/4295; G06F 13/4252; G06F 13/4269; G06F 13/4282; G06F 13/382;
(Continued)

(56) References Cited

U.S. PATENT DOCUMENTS

| 6,732,218 B2 | 5/2004 | Overtoom et al. |
| 7,502,878 B1 * | 3/2009 | Wright ............... G06F 13/4022 710/37 |
| 9,460,037 B2 | 10/2016 | Voto et al. |
| 9,575,917 B1 * | 2/2017 | Zhu ...................... G06F 13/385 |

(Continued)

OTHER PUBLICATIONS

Philips Semiconductors, AN10034_2, ISP1261 USB OTG Bridge Controller and SEOC Protocol, Rev. 02.01, Mar. 30, 2004, 12 pages.
Microchip USB MultiSwitch Hub, USB2524 Datasheet, Aug. 20, 2013, 62 pages.

* cited by examiner

*Primary Examiner* — Ernest Unelus
(74) *Attorney, Agent, or Firm* — Cesari and McKenna, LLP

(57) ABSTRACT

Apparatus and methods for a USB hub connected to USB host and one or more USB devices to support the USB host and the USB devices to dynamically switch roles such that a product which initially operates as a USB device operates a USB host while a USB host supports additional operation as a USB device. Products such as smartphones, initially operating as USB devices, may dynamically switch roles to become USB hosts. Similarly USB hosts, such as PCs and in-vehicle infotainment systems, initially operating as USB hosts may dynamically support additional operation as USB devices. The USB hub includes an upstream port connected to the USB host and one or more downstream ports connected to the products operating as USB devices and supports reconfiguring the downstream ports to upstream ports to enable the role switching the USB devices to become USB hosts while the USB hub maintains the upstream port connection to the USB host to operate as USB device.

20 Claims, 24 Drawing Sheets

Related U.S. Application Data continuation of application No. 14/699,558, filed on Apr. 29, 2015, now Pat. No. 9,811,488.

(60) Provisional application No. 61/985,786, filed on Apr. 29, 2014.

(52) U.S. Cl.
CPC .. *G06F 13/4045* (2013.01); *G06F 2213/0042* (2013.01); *G06F 2213/3854* (2013.01)

(58) Field of Classification Search
CPC .............. G06F 13/4022; G06F 9/5044; G06F 13/4045; G06F 2213/3854; G06F 13/4027; G06F 13/426; H04L 12/40136
See application file for complete search history.

(56) References Cited

U.S. PATENT DOCUMENTS

| | | | |
|---|---|---|---|
| 9,645,962 B2 | 5/2017 | Voto et al. | |
| 2004/0088449 A1 | 5/2004 | Sakaki | |
| 2005/0204072 A1* | 9/2005 | Nakagawa | H04L 12/40136 710/8 |
| 2008/0141259 A1* | 6/2008 | Tjia | G06F 9/5044 718/104 |
| 2009/0006686 A1* | 1/2009 | Kimura | G06F 13/4295 710/106 |
| 2012/0059965 A1* | 3/2012 | Foster | G06F 1/12 710/305 |
| 2015/0270733 A1* | 9/2015 | Inha | H02J 7/0054 320/103 |
| 2018/0332160 A1* | 11/2018 | Brogan | G06F 1/1626 |

APPARATUS AND METHODS FOR DYNAMIC ROLE SWITCHING AMONG USB HOSTS AND DEVICES

CROSS-REFERENCE TO RELATED APPLICATIONS

The present application is a continuation of U.S. patent application Ser. No. 15/724,677 entitled "Apparatus And Methods For Dynamic Role Switching Among USB Hosts And Devices," filed on Oct. 4, 2017 by Terrill M. Moore, which is a continuation of U.S. patent application Ser. No. 14/699,558, entitled "Apparatus And Methods For Dynamic Role Switching Among USB Hosts And Devices," filed on Apr. 29, 2015 by Terrill M. Moore, now issued on Nov. 7, 2017 as U.S. Pat. No. 9,811,488, which claims the benefit of U.S. Provisional Patent Application Ser. No. 61/985,786, entitled "Apparatus And Methods For Dynamic Role Switching Among USB Hosts And Devices," filed on Apr. 29, 2014 by Terrill M. Moore, the contents of which are incorporated by reference herein in their entirety.

BACKGROUND

Technical Field

The present disclosure relates generally to universal serial bus (USB) hosts and devices and, more specifically, to apparatus and methods for enabling USB hosts and devices to dynamically switch roles.

Background Information

Over the past 20 years or so, USB has emerged as the preferred, if not dominant, standard for interfacing personal computers or other consumer electronics products with mass storage, printers, digital cameras, media players, keyboards and the like. Users enjoy the convenience and simplicity of USB, while manufacturers and software developers enjoy the benefits of supporting a single standard interface, although there are several different USB specifications that include different speeds.

According to the USB specifications, a given piece of equipment must operate as either a USB host or a USB device. The roles of USB host and USB device have implications with respect to which piece of equipment controls the communication path between the host and device, supplies power (or consumes power supplied by the other), and the like. The original USB specifications were adopted during a period of time when PCs were a dominant user platform and therefore a natural paradigm for a USB host. However, the emergence of smartphones, tablets and other products which typically operate as USB devices, but which contain ample processing power, memory and other resources (e.g., applications) to operate as USB hosts, has created the potential for new services and user experiences.

One USB specification known as USB On-The-Go or OTG provides for USB devices to switch roles and become USB hosts when appropriate (e.g., a digital camera, which operates as a USB device when connected to a PC, switches to become a host when connected to a flash drive). However, OTG has at least two significant disadvantages. First, OTG requires a different connector with an additional pin and a special cable, and will not work with the widely used USB Type A connector. Second, OTG requires a direct connection between a USB host and a USB device, and will not work if one or more USB hubs are present in the communication path between the host and device. This is because conventional USB hubs adhere to the standard USB topology in which one port of the USB hub is designated the upstream port and all other ports are designated downstream ports.

At least one vendor has attempted to address the problem of USB hub port designation by introducing a configurable USB hub in which the upstream/downstream designations of some ports may be changed. However, in order to interoperate with the configurable USB hub, a USB device must include a full USB stack including hub support which may not be possible or desirable. Further, when a USB host and USB device connected to the configurable hub switch roles, the USB host-turned-device would not be capable of accessing any other devices on the same USB bus tree.

SUMMARY OF THE INVENTION

In brief summary, the present invention provides apparatus and methods for USB hosts and USB devices to dynamically switch roles such that a product which initially operates as a USB host may switch and operate instead as a USB device and vice versa. Products such as smartphones and tablets which initially operate as USB devices may dynamically switch roles to become USB hosts, and may do so without burdening applications which may be running on such devices. Similarly, products such as PCs and in-vehicle infotainment systems which initially operate as USB hosts may dynamically switch roles to become USB devices. Further, once an initial USB device switches roles and becomes a USB host it has access to other devices on the same USB tree. The present invention enables dynamic USB role switching in a variety of topologies including those in which a direct connection exists between a host and a device as well as those in which one or more role-switching or remote device supporting USB hubs are present. In addition, such dynamic role switching may be performed in topologies which incorporate widely used USB Type A connectors and cables, thus avoiding the need for a special connector or cable.

In accordance with one embodiment of the invention, a USB host and USB device which are directly connected to each other may switch roles. In this topology, a product which initially operates as a USB host includes both a USB host stack and a USB device stack in addition to a root port. A protocol is executed in which an application running on a USB device communicates with the USB host. When the protocol determines that the USB device is capable of role switching and that role switching is appropriate, the protocol operates to switch the roles such that the product which acted initially as the USB host begins to operate as a USB device and vice versa.

In accordance with another embodiment of the invention, USB hosts and USB devices may also switch roles when indirectly connected to each other through one or more role-switching USB hubs. In this topology, the product which acts initially as a USB host includes both a USB host stack and a USB device stack in addition to a root port. Each role-switching USB hub includes at least two role-switching ports each of which may be dynamically changed from an upstream port to a downstream port and vice versa. The product which acts initially as a USB host is connected to the upstream port of a role-switching hub, while a product which acts initially as a USB device is connected to the downstream port of the hub. A protocol is executed in which communication is established between the USB host and USB device through the role-switching hub. When the protocol determines that the USB device is capable of role switching and that role switching is appropriate, the protocol operates to reverse the upstream/downstream designations of the ports and switch the USB roles of the two products. The protocol is capable of switching the roles of multiple role-switching hubs which are located between an initial USB host and an initial USB device.

In accordance with another embodiment of the invention, a hub with remote device support is provided. Such remote device support enables an initial USB device, which is connected to the hub, to switch roles and become a USB host which controls one or more remote USB devices supported within the hub. A protocol is executed in which is the USB host causes the hub to change the downstream port (to which the remote USB device is connected) to an upstream port, while also enabling the remote USB device to listen to traffic from that port. Further, the protocol causes the remote USB device to appear to the role-switched USB host as a new device, attached to an internal port of the hub, which can be controlled by the role-switched USB host. In addition, by executing the protocol with respect to more than one initial USB device each of which is connected, respectively, to a separate downstream port (which may be changed to an upstream port), the hub enables a single role-switched USB host to control multiple role-switched USB devices.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
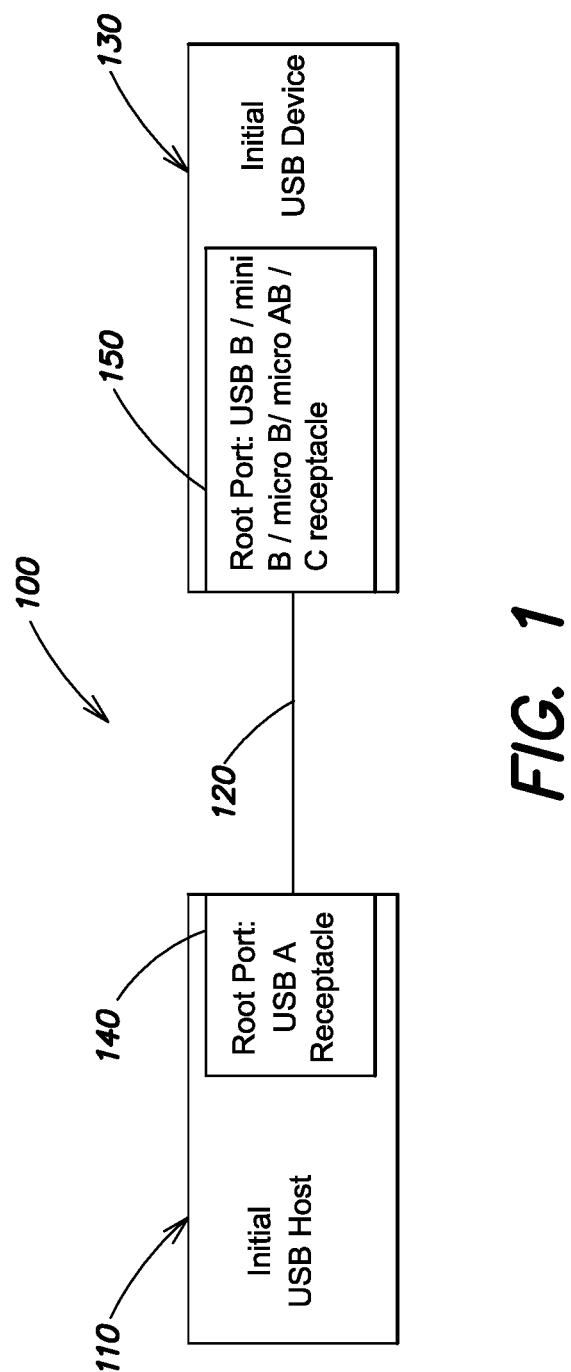
FIG. 1 is a block diagram of an initial USB host directly connected to an initial USB device in which both host and device may switch roles in accordance with one embodiment of the present invention.

FIG. 1 shows a block diagram of a system 100 which includes an initial USB host 110 directly connected, via a USB cable 120, to an initial USB device 130. Initial USB host 110 is capable of switching roles, as described herein, and becoming a USB device. However, because it acts initially as a USB host, the term initial USB host is used herein. Initial USB host 110 may represent, for example, a personal computer (PC), an in-vehicle infotainment system (IVI), or any of a number of other products or equipment. Initial USB host 110 includes hardware and software configured to provide a root port 140. Initial USB host 100 also includes a physical interface, a USB Type A receptacle of the appropriate gender to connect with USB cable 120.

Initial USB device 130 may represent, for example, a smartphone, digital camera, MP3 player, mass storage or any of a number of other products or equipment. Initial USB device 130 is capable of switching roles, as described herein, and becoming a USB host. Initial USB device 130 includes hardware and software configured to provide a root port 150. Initial USB device 130 also includes a physical interface which may be implemented with any one of a USB Type B, mini B, micro B, micro AB or Type C receptacle of the appropriate gender to connect with USB cable 120.

Figure 2:
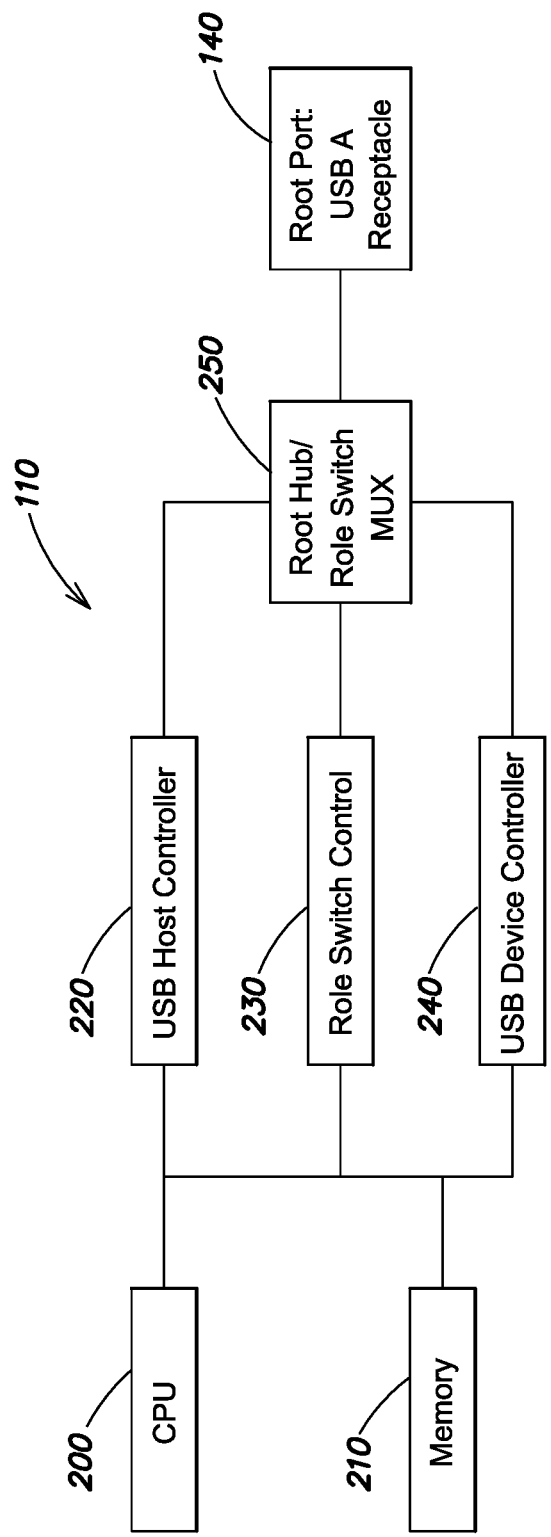
FIG. 2 is a block diagram of the initial USB host shown in FIG. 1.
Figure 4A:
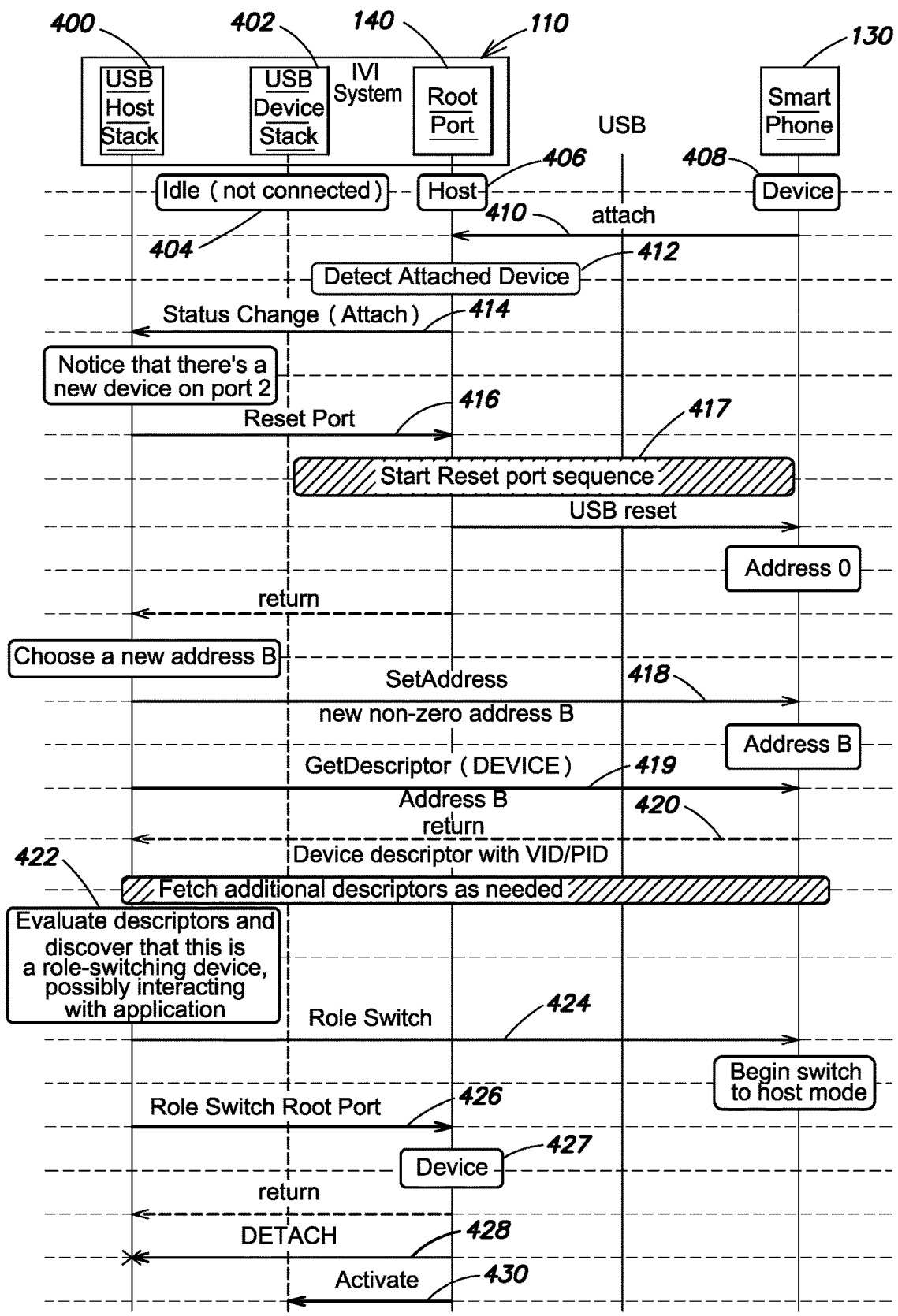
FIGS. 4A-4B are a message flow diagram of a protocol by which the initial USB host and initial USB device shown in FIG. 1 may switch roles.
Figure 4B:
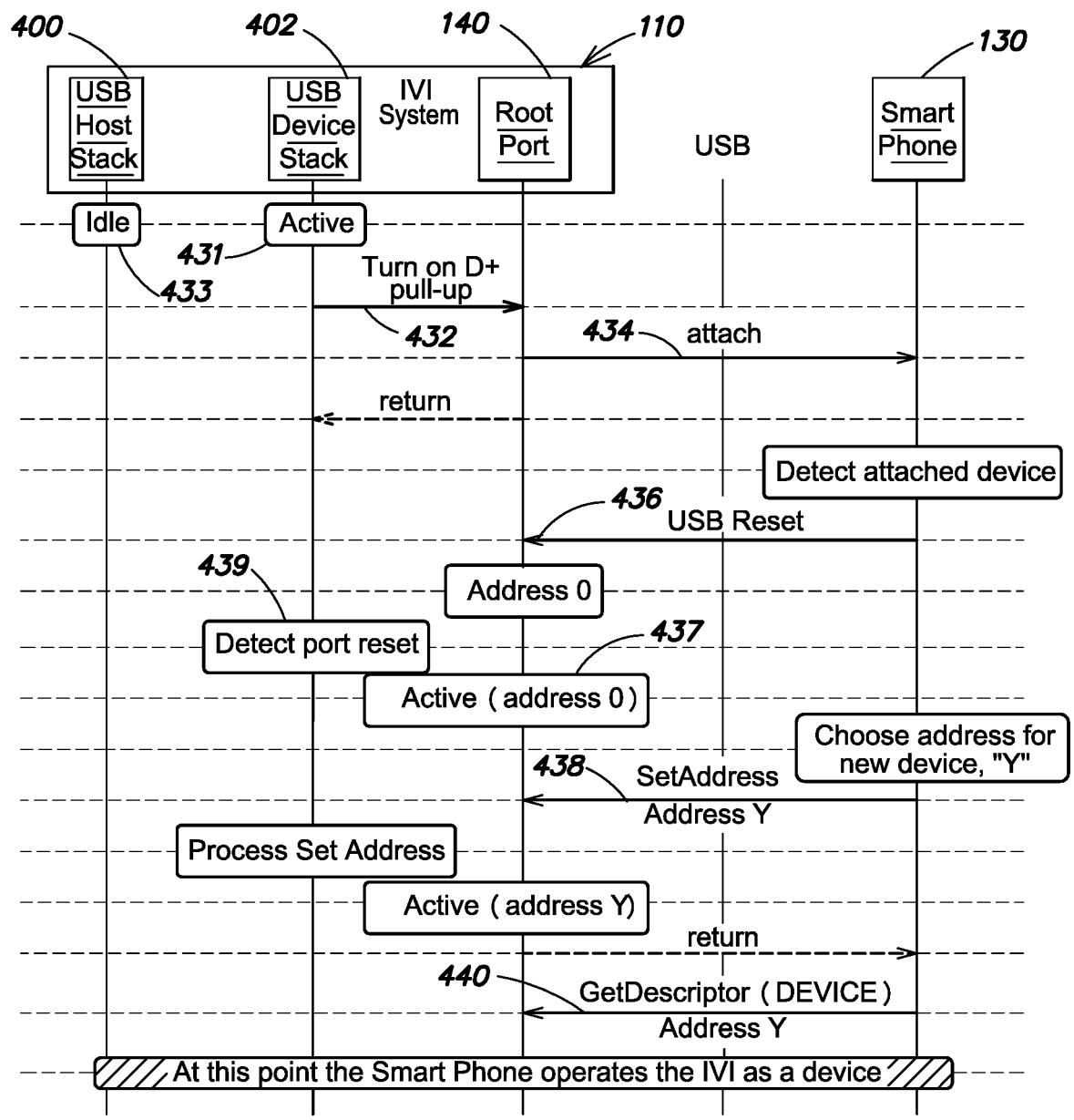

As shown in FIG. 2, initial USB host 110 includes a central processing unit (CPU) 200 and memory 210. Initial USB host 110 also includes a USB host controller 220, a role switch control 230, a USB device controller 240, and a root hub/role switch multiplexer 250 in addition to root port 140. USB host controller 220 provides the mechanical, electrical and signaling circuitry needed for initial USB host 110 to communicate with and control initial USB device 130. Role switch control 230, as described in detail below in connection with FIGS. 4A-4B, is primarily responsible for executing a protocol by which initial USB host 110 switches roles and becomes a USB device. USB device controller 240 provides the mechanical, electrical and signaling circuitry needed for initial USB host 110 to be controlled as a USB device following a role switch. Root hub/role switch multiplexer 250 functions to direct messages between root port 140 and other components of initial USB host 110.

Memory 210 may include a plurality of locations that are addressable by CPU 200, USB host controller 220, role switch control 230 and USB device controller 240 for storing software programs and data structures associated with the embodiments described herein. CPU 200 may include logic adapted to execute the software programs and manipulate (i.e., control) the data structures as described in detail below. An exemplary CPU 200 may include single or multi-core Central Processing Unit (CPU), Graphics Processing Unit (GPU), Field Programmable Gate Array (FPGA) and/or Application Specific Integrated Circuit (ASIC).

An operating system (not shown), portions of which are typically resident in memory 210 and executed by CPU 200, functionally organizes initial USB host 110 by, inter alia, invoking operations in support of software processes and/or applications executing on the host 110. A suitable operating system may include the Windows® series of operating systems from Microsoft Corp. of Redmond, Wash., the Linux® operating system, the MAC OS® series of operating systems from Apple Inc. of Cupertino, Calif., and the UNIX® series of operating system, among others. The software processes/applications may include various processes/applications of a USB role switching process described herein and, as such, contain computer executable instructions executed by CPU 200 to perform functions described herein.

It will be apparent to those skilled in the art that other types of processors and memory, including various tangible non-transitory computer-readable media, may be used to store and execute program instructions pertaining to the system described herein. Also, while the embodiments herein are described in terms of software processes/applications stored in memory, alternative embodiments also include those processes/applications being embodied as modules consisting of hardware, software, firmware, or combinations thereof.

Figure 3:
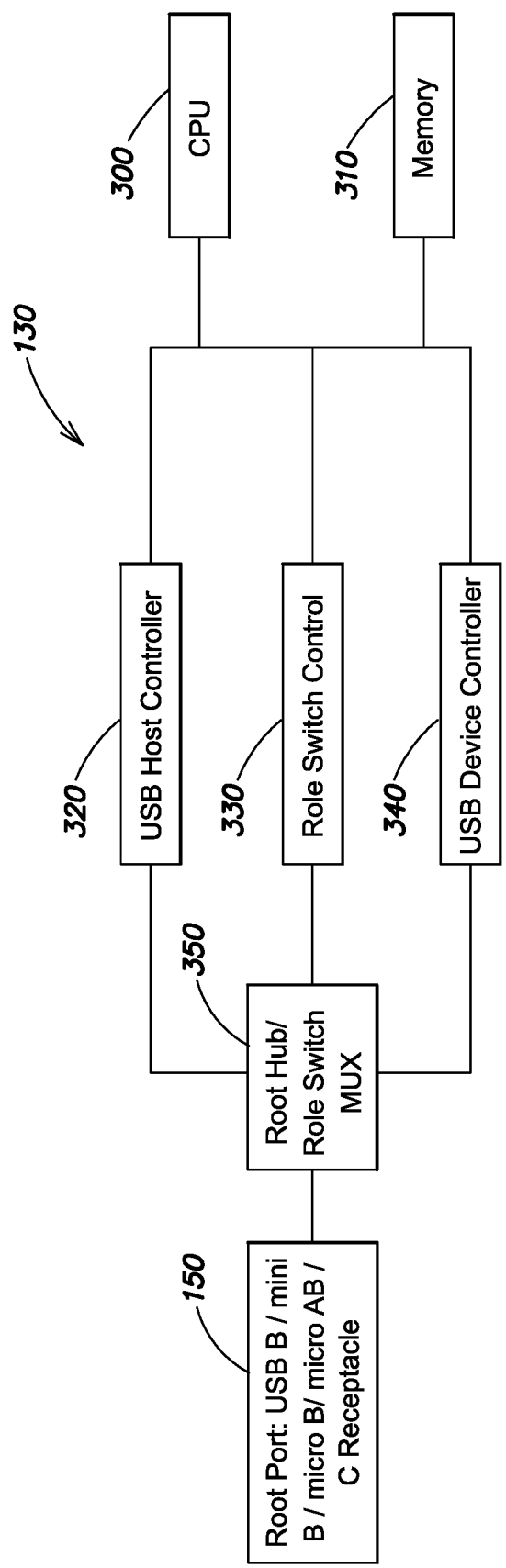
FIG. 3 is a block diagram of the initial USB device shown in FIG. 1.

As shown in FIG. 3, initial USB device 130 typically includes hardware and software that is similar to that of initial USB host 110. Specifically, initial USB device 130 includes a CPU 300 and memory 310. Initial USB device 130 also includes a USB host controller 320, role switch control 330, a USB device controller 340, and a root hub/role switch multiplexer 350 in addition to root port 150. Initial USB device 130 typically also includes an operating system (not shown) which, in general, performs functions similar to those described above.

In order for initial USB host 110 and initial USB device 130 of FIG. 1 to switch roles, a protocol or other communication is needed. An example of a protocol for implementing role switching is shown in FIGS. 4A-4B in which an invehicle infotainment system (IV) represents initial USB host 110, and a smartphone represents initial USB device 130. As the protocol begins, a USB device stack 402 (which may form part of USB device controller 240 shown in FIG. 2) within initial USB host 110 is in an idle (not connected) state 404. A root port 140 of the initial USB host 110 is in a state 406 to act as a USB host. Initial USB device 130 is in a state 408 to act as a USB device.

Initial USB device 130 sends an attach message 410 to root port 140 of initial USB host 110. Root port 140 detects 412 an attached device and responds by sending a status change (attach) message 414 to USB host stack 400 (which may form part of USB host controller 220 shown in FIG. 2). Now aware of the presence of a new device on root port 140, USB host stack 400 responds by sending a reset port message 416 to root port 140 which initiates a reset port sequence 417 of messages and responses. The reset port sequence functions to reset an address to zero for initial USB device 130. Subsequently, USB host stack 400 obtains a new non-zero address (e.g., address B) for initial USB device 130 and assigns that new non-zero address by sending a set address message 418 to initial USB device 130. Next, in order to learn about the characteristics and capabilities of initial USB device 130, USB host stack 400 sends a get descriptor (device) message 419 to initial USB device 130, which returns device descriptor information 420 to USB host stack 400.

At step 422, USB host stack 400 evaluates the device descriptor information it received regarding initial USB device 130 and determines that role switching is possible and appropriate. This determination may be based on a number of criteria including, for example, the features and capabilities of initial USB device 130, the presence or absence of a particular application on initial USB device 130, the presence or absence of particular media or data on initial USB device 402 and so on.

Once a determination is made by initial USB host 110 that role switching is possible and appropriate, USB host stack 400 issues a role switch message 424 to initial USB device 130. Subsequently, USB host stack 400 issues a role switch root port message 426 to root port 140. Root port 140 responds by transitioning to a state 427 to act as a USB device, and sending a detach message 428 to USB host stack 400, which detaches the root port from the host stack. Next, root port 140 sends an activate message 430 to USB device stack 402, thereby causing USB device stack 402 to transition to an active state 431. Contemporaneously, USB host stack 400 transitions to an idle state 433.

The now active USB device stack 402 sends a message 432 to root port 408 to turn on a D+ pullup to signify that something is attached to root port 140. In response, root port 140 sends an attach message 434 to smartphone 130 which has now switched its role from initial USB device to role-switched USB host. Having detected an attached device (i.e., role-switched USB device 110 which has now switched its role from initial USB host to role-switched USB device), role-switched USB host 130 issues a USB reset message 436 to root port 140 which resets the root port's address to zero and causes the root port to transition to an active state (address 0) 437. USB device stack 402 detects 439 that root port 140 has reset.

Next, role-switched USB host 130 chooses a new non-zero address (e.g., address Y) for root port 140 and assigns the new address by way of a set address message 438. In response, root port 408 transitions to an active state (address Y). In order to learn about the characteristics and capabilities of role-switched USB device 110, role-switched USB host 130 sends a get descriptor (device) message 440 to root port 140 (address Y) which returns descriptor information. At this point, the role-switching is complete and role-switched USB host (smartphone) 130 is controlling role-switched USB device (IVI) 110 as a device.

Figure 5:
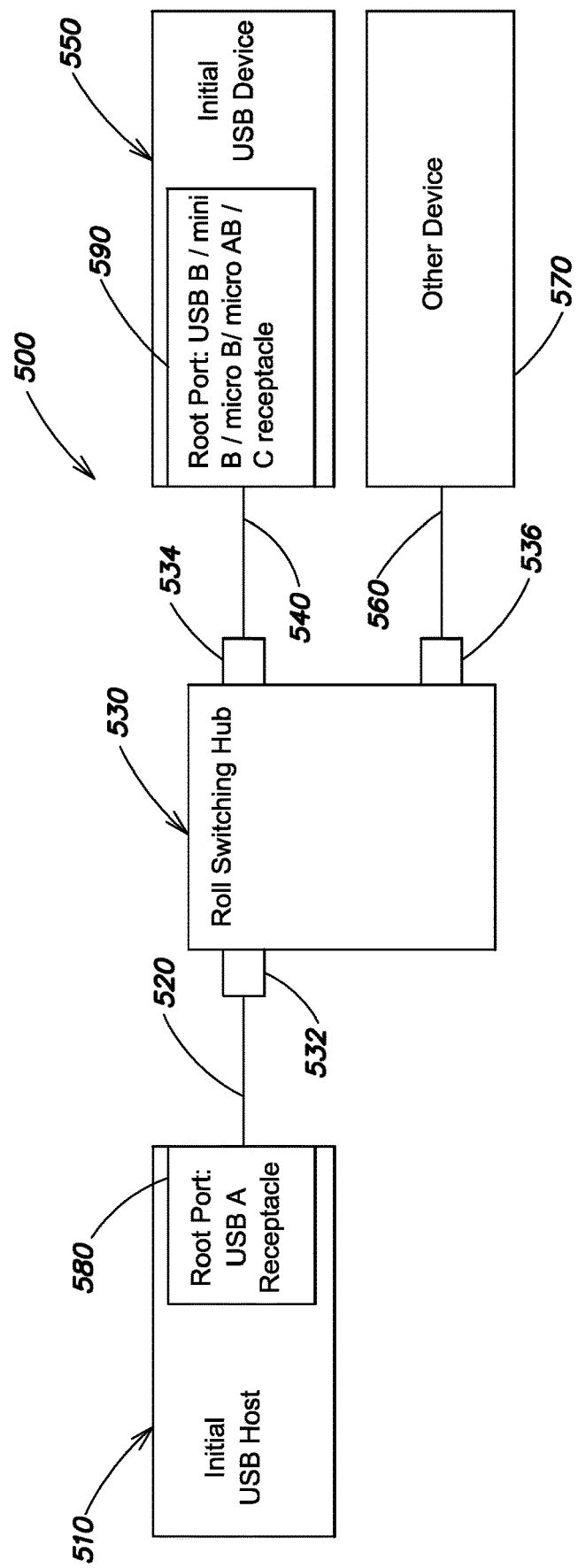
FIG. 5 is a block diagram of an initial USB host connected through a role switching hub to an initial USB device in accordance with another embodiment of the present invention.
Figure 6A:
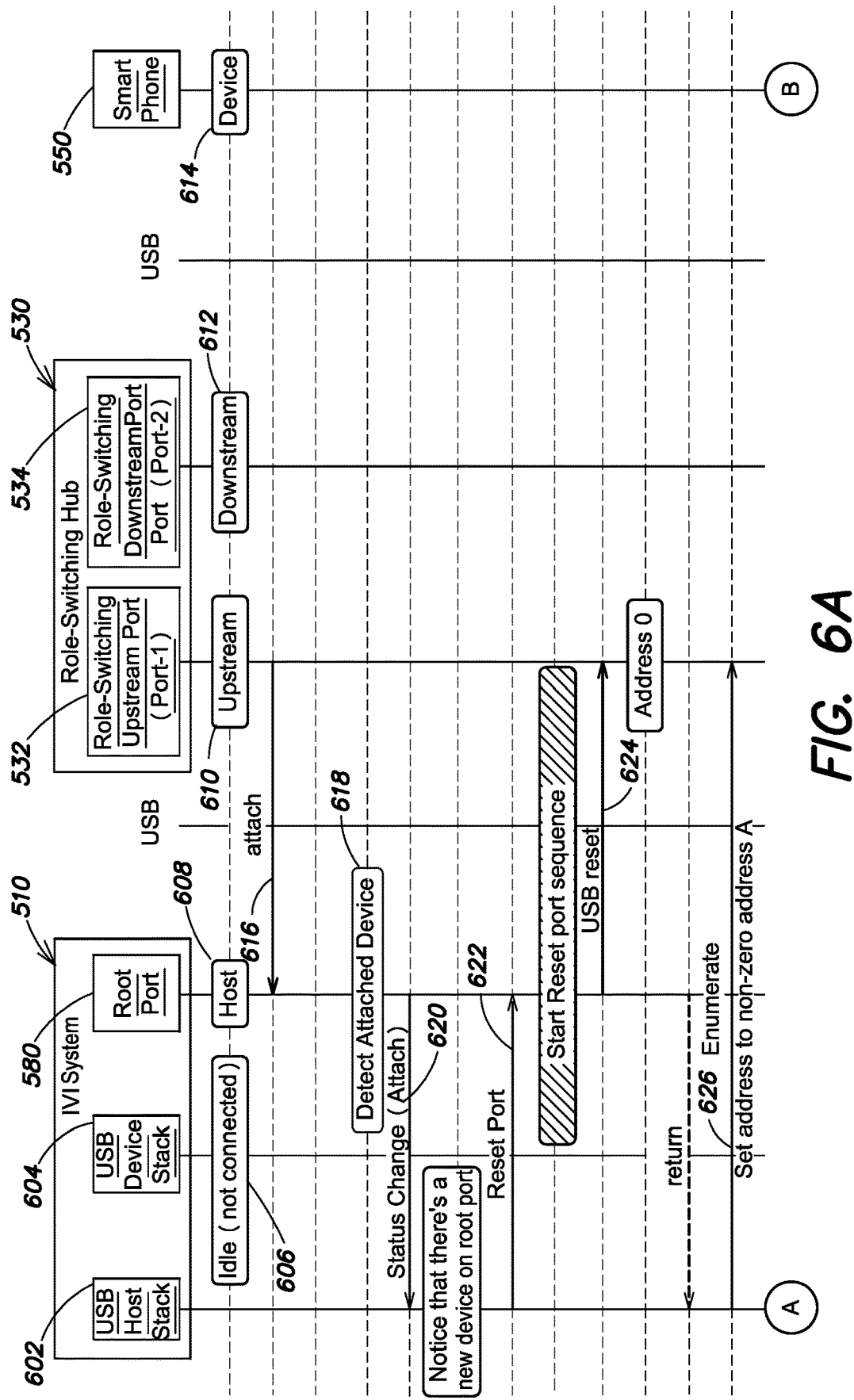
FIGS. 6A-6F are message flow diagrams of a protocol by which the initial USB host and initial USB device shown in FIG. 5 may switch roles.
Figure 6B:
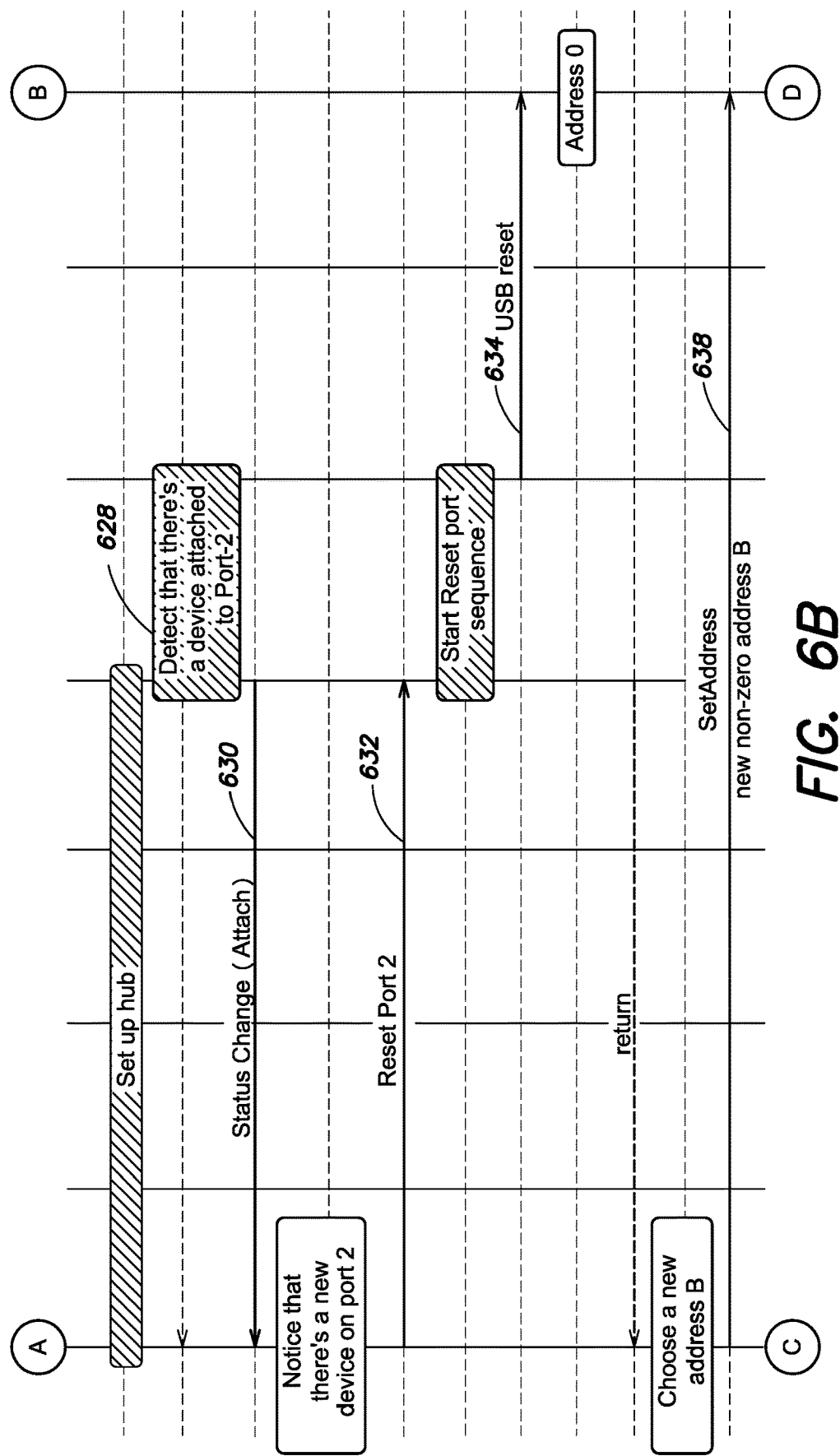
Figure 6C:
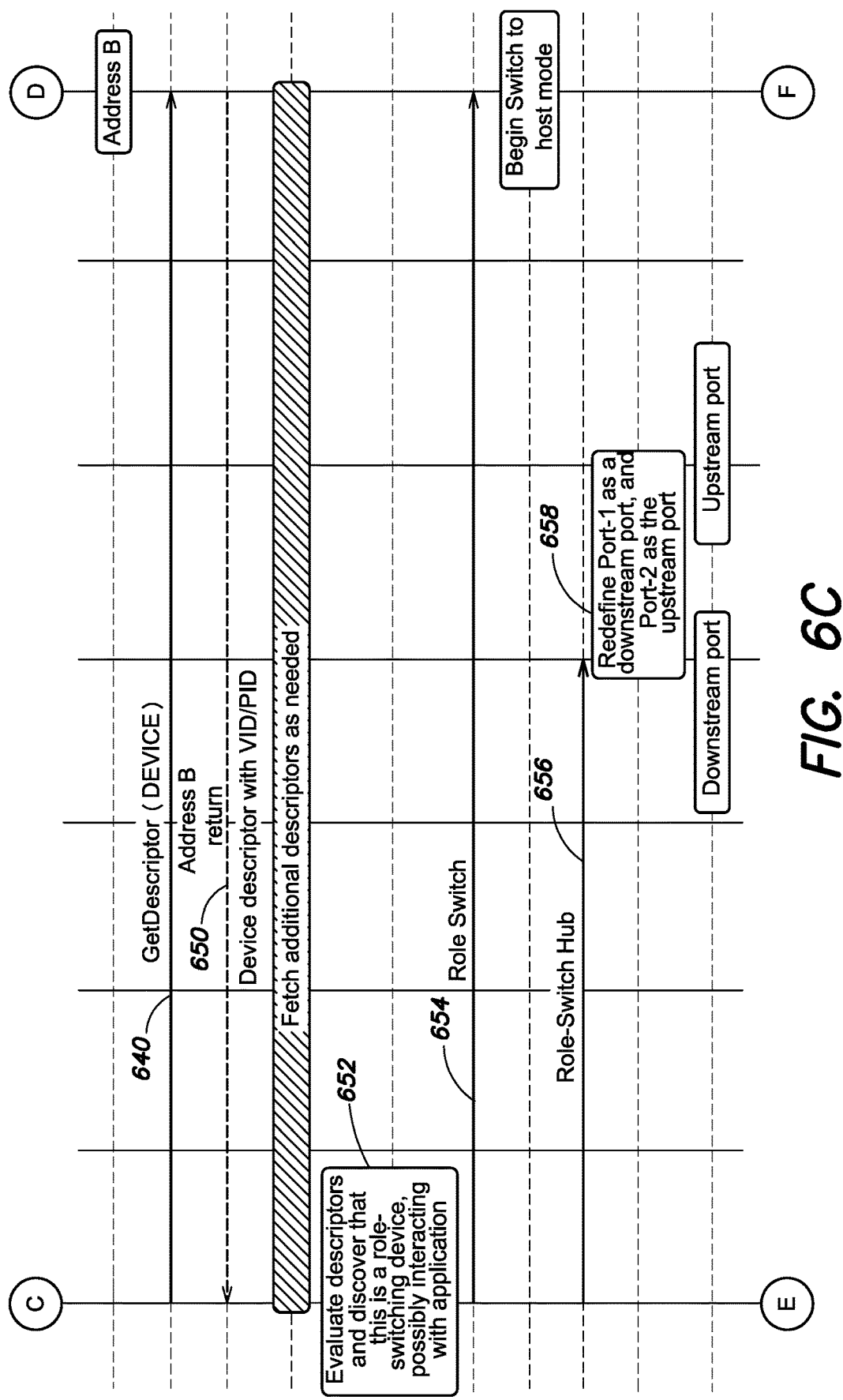
Figure 6D:
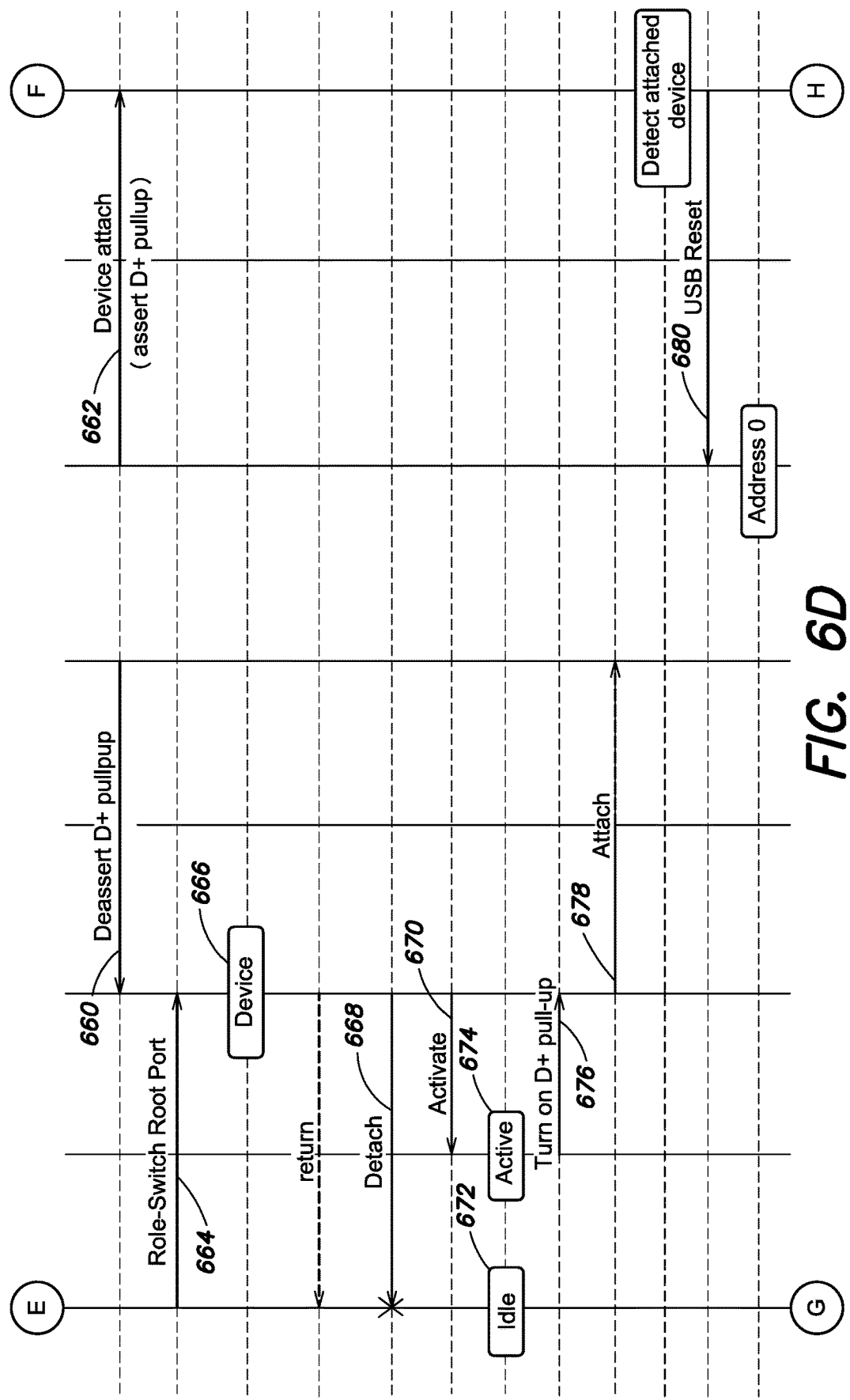
Figure 6E:
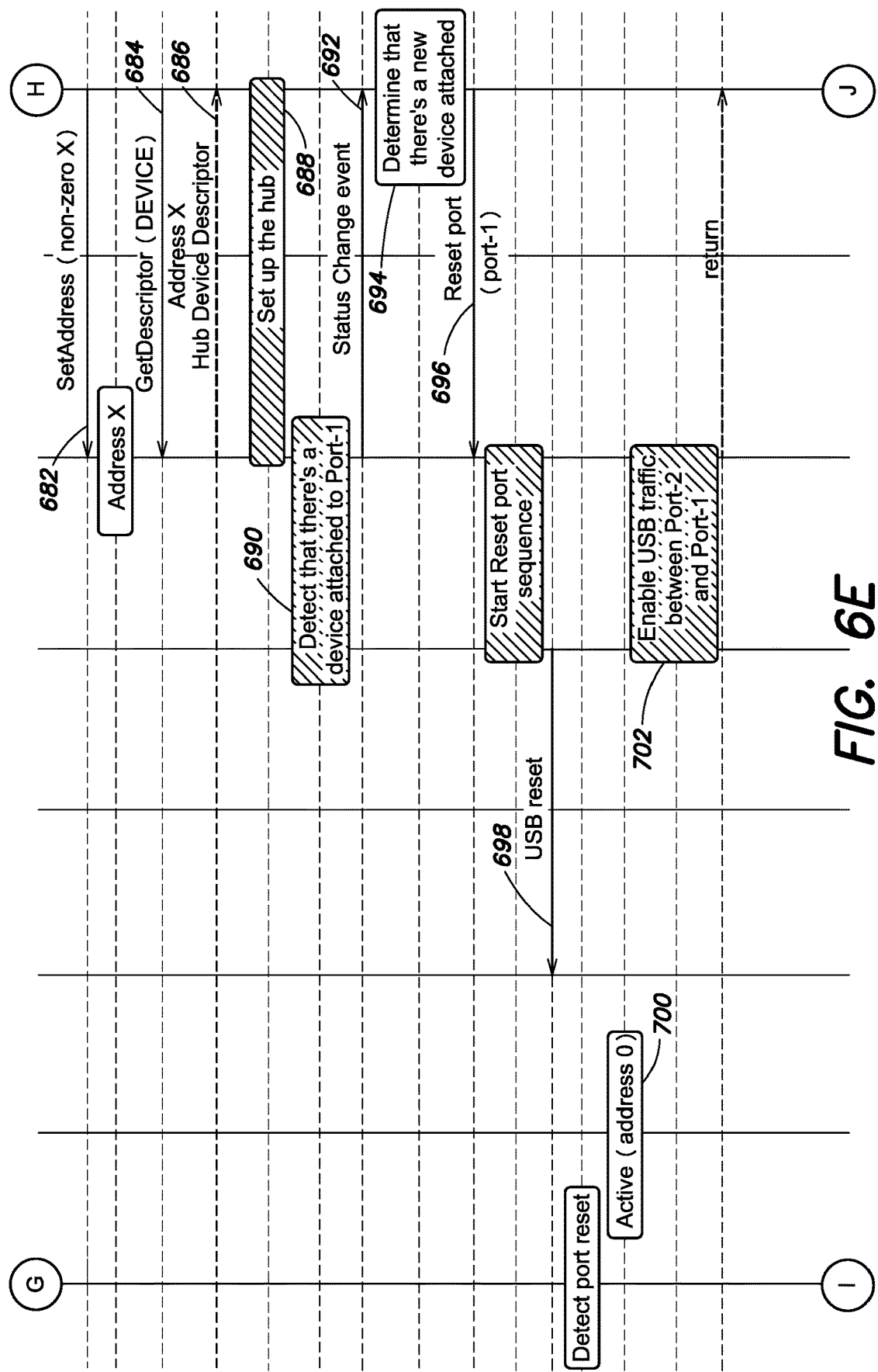
Figure 6F:
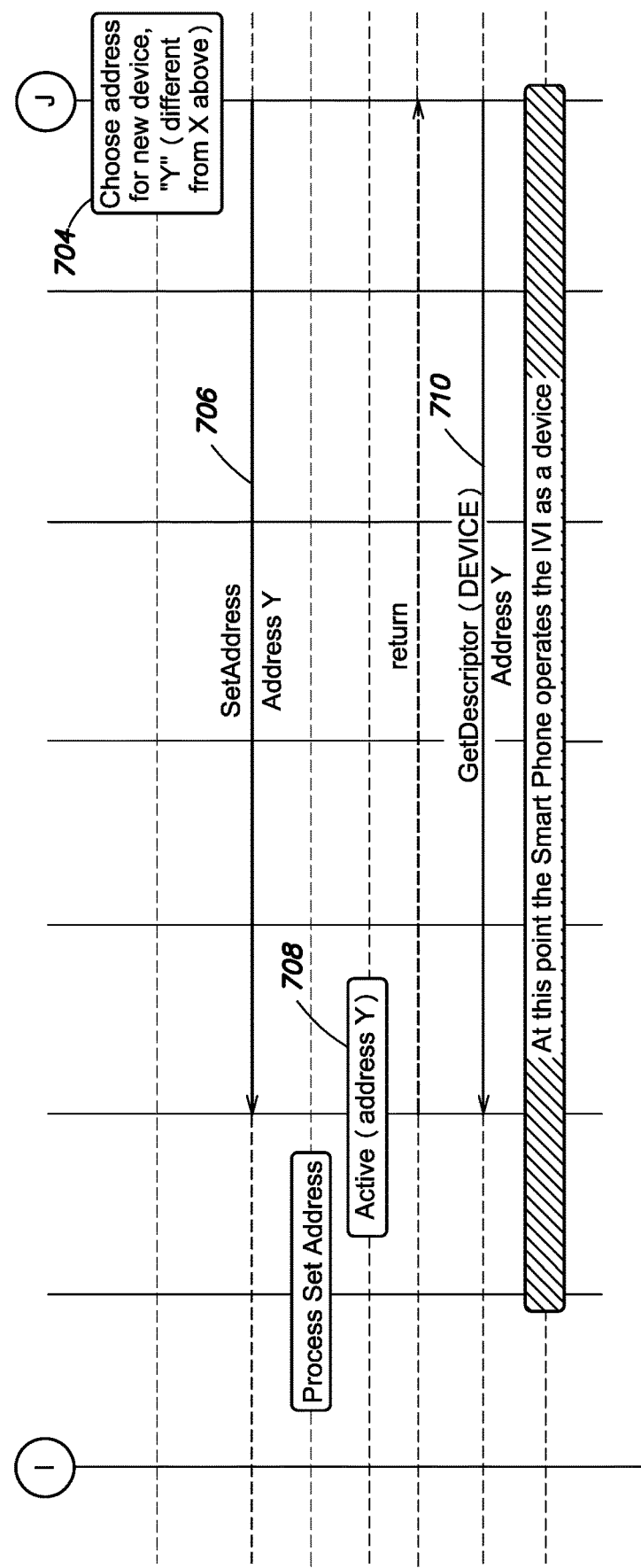

With reference now to FIG. 5, a system 500 is shown in which an initial USB host 510 and initial USB device 550 are not directly connected to each other, but instead are connected to a role switching hub 530. More specifically, initial USB host 510 is connected by a USB cable 520 to an upstream port 532 of role switching hub 530. Initial USB host 510 includes a root port 580. Initial USB device 550 is connected by a USB cable 540 to a downstream port 534 of role switching hub 530. Initial USB device 550 includes a root port 590. Another USB device 570 is connected by a USB cable 560 to a second downstream port 536 of role switching hub 530.

In general, initial USB host 510 and its root port 580 are comparable in functionality to initial USB host 110 and its root port 140, respectively, described above. Similarly, initial USB device 550 and its root port 590 are comparable in functionality to initial USB device 130 and its root port 150, respectively. Role switching hub 530 is dynamically configurable such that a port, e.g., port 532, which is initially configured as an upstream port may be dynamically changed to a downstream port and vice versa. Such a role switching hub is commercially available from Microchip Technology, Inc., Chandler, Ariz.

FIGS. 6A-6F show an example of protocol for implementing role switching among initial USB host 510, role switching hub 530, and initial USB device 550. Similar to the example described above in connection with FIGS. 4A-4B, in FIGS. 6A-6F an IVI system represents initial USB host 510, and a smartphone represents initial USB device 550. As the protocol begins, a USB device stack 604 within initial USB host 510 is in an idle (not connected) state 606. Root port 580 of initial USB host 510 is in a state 608 to act as a USB host. Port 532 of role switching hub 530 is configured in an upstream state 610, while port 534 is configured in a downstream state 612. Initial USB device 550 is in a state 614 to act as a device.

Upstream port 532 sends an attach message 616 to root port 580. Root port 580 detects 618 an attached device and responds by sending a status change (attach) message 620 to USB host stack 602. USB host stack 602 responds by issuing a reset port message 622 to root port 580 which initiates a reset port sequence of messages and responses. That sequence begins with a USB reset message 624 from root port 580 to upstream port 532, which results in assignment of address 0 to upstream port 532. Subsequently, USB host stack 602 sends an enumerate message 626 to upstream port 532 which results in assignment of a non-zero address A to upstream port 532. Next, at step 628, role switching hub 530 detects that a device is attached to downstream port 534, and responsively sends a status change (attach) message 630 to USB host stack 602.

Noting the presence of a new device, USB host stack 602 sends a reset port message 632 to upstream port 532, which causes downstream port 534 to send a USB reset message 634 to initial USB device 550. Message 634 results in assignment of address 0 to initial USB device 550. Subsequently, USB host stack 602 sends a set address message 638 to initial USB device 550 which assigns a new non-zero address B to device 550. USB host stack 602 then sends a get descriptor (device) message 640 to initial USB device 550 to obtain device descriptor information 650 regarding device 550.

At step 652, USB host stack 602 evaluates device descriptor information it received regarding initial USB device 550 and determines that role switching is possible and appropriate. This evaluation may consider a number of criteria including, for example, whether it is possible to role-switch the entire path between initial USB host 510 and initial USB device 550, whether initial USB device 550 is connected to a port on a role-switching hub, whether other devices on the USB bus tree are interacting with initial USB host 510 and so on. Alternatively, initial USB host 510 may make the role switching determination based on administrative settings or input from a user interface.

Once a determination is made by initial USB host 510 to role switch, USB host stack 602 issues a role switch message 654 to initial USB device 550. This is followed by role switch hub message 656 from USB host stack 602 to upstream port 532. Message 656 causes role switching hub 530 to reconfigure itself such that upstream port 532 becomes a downstream port, and downstream port 534 becomes an upstream port at 658.

Next, at step 660, role-switched downstream port 532 sends a message to deassert a D+ pullup at root port 580. Role-switched upstream port 534 sends a device attach message 662 to role-switched USB host (smartphone) 550. USB host stack 602 then sends a role-switch message 664 to root port 580, thereby causing the root port to transition to a state 666 where it acts as a role-switched USB device. Root port 580 then sends a detach message 668 to USB host stack 602, followed by an activate message 670 to USB device stack 604. As a result, USB host stack 602 transitions to an idle state 672 and USB device stack 604 transitions to an active state 674. The now active USB device stack 604 sends a message 676 to root port 508 to turn on a D+ pullup to signify that something is attached to root port 508.

Root port 580 sends an attach message 678 to role-switched downstream port 532 which causes role-switched USB host 550 to detect an attached device and, in turn, send a USB reset message 680 to role-switched upstream port 534 thereby assigning address 0 to that port. This is followed by a set address message 682 sent from role-switched USB host 550 to role-switched upstream port 534, changing the address of that port to a non-zero value X. Next, role-switched USB host 550 sends a get descriptor (device) message 684 to role-switched upstream port 534, which responds with device descriptor information 686 for role-switching hub 530. Following hub setup 688, a device (i.e., the role-switched USB device 510) is detected 690, a status change event message 692 is sent from port 534 to role-switched USB device 550, and a determination 694 is made there is a new device connected to port 532. This is followed by a reset port message 696 sent from role-switched USB device 550 to port 534, which in turn is followed by a USB reset message 698 send from port 532 to root port 580. This results in root port 580 transitioning to an active state (address 0) 700.

At 702, hub 530 enables USB traffic between port 532 and port 534. Next, role-switched USB host 550 chooses 704 a new non-zero address Y (different from address X above) for role-switched USB device 510. A set address message 706 is sent to root port 580 and effectively assigns address Y to role-switched USB device 510, which causes root port 580 to transition to an active (address Y) state 708. Next, role-switched USB host 550 sends a get descriptor (device) message 710 to root port 580, thereby completing the role-switching among initial USB host 510, role switching hub 530 and initial USB device 550.

The protocol shown in FIGS. 6A-6F may also be used in a topology in which multiple role-switching hubs are present. For example, in the topology of FIG. 5, if one or more additional role-switching hubs were present between downstream port 534 and initial USB device 550, the protocol shown in FIGS. 6A-6F would detect such additional role-switching hubs and would recursively switch the role of each hub (steps 656-662) beginning with the one closest to initial USB device 550. Once the role of the last hub (the one closest to the initial USB host 510), the role of root port 580 is switched (step 664) and the remainder of the protocol completed.

Figure 7A:
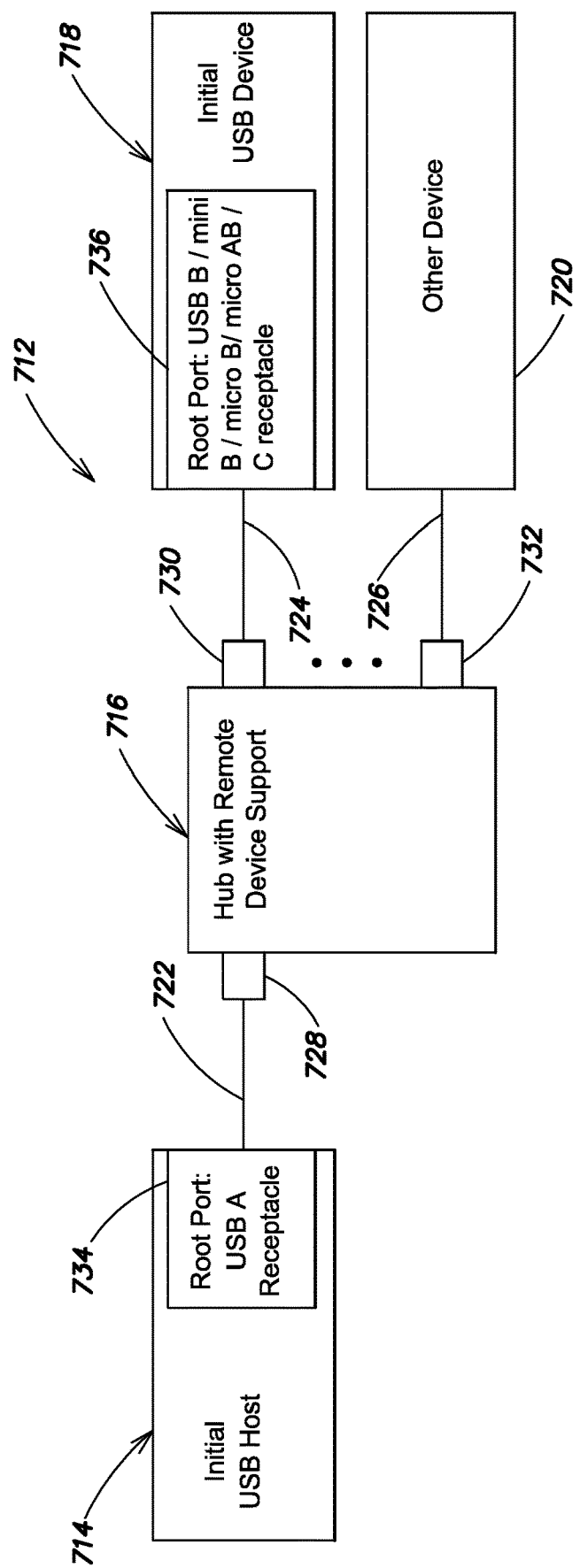
FIG. 7A is a block diagram an enhanced USB hub, capable of supporting remote USB devices, connected with a USB host and a two USB devices in accordance with another embodiment of the present invention.

Turning now to FIG. 7A, a system 712 includes an initial USB host and remote USB device which are not directly connected to each other, but instead are connected to a hub with remote device support. More specifically, system 712 includes an initial USB host 714 connected by a USB cable 722 to an upstream port 728 of a remote device support hub 716. Initial USB host 714 includes a root port 734. An initial USB device 718 is connected by a USB cable 724 to a downstream port 730 of remote device support hub 716. Remote USB device 718 includes a root port 736. Another USB device 720 is connected by a USB cable 726 to a second downstream port 732 of remote device support hub 716.

In general, initial USB host 714 and its root port 734 are comparable in functionality to initial USB host 110 and its root port 140, respectively, described above. Similarly, initial USB device 718 and its root port 736 are comparable in functionality to initial USB device 130 and its root port 150, respectively. In accordance with one aspect of the present invention, remote device support hub 716 includes functionality, described herein, that is not found in conventional USB hubs.

Figure 7B:
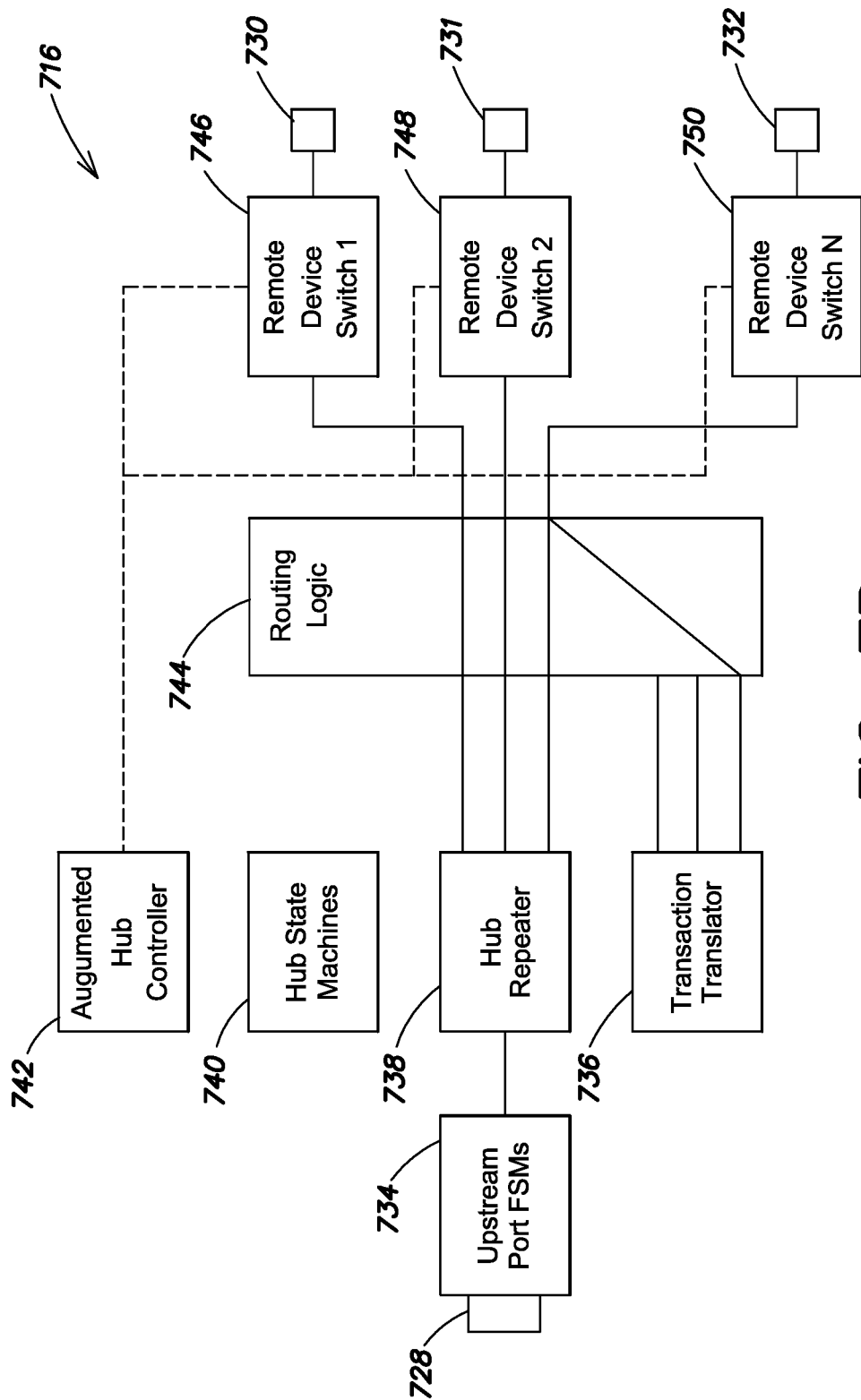
FIG. 7B is a detailed block diagram of the enhanced USB hub shown in FIG. 7A.

As shown in FIG. 7B, remote device support hub 716 includes upstream port finite state machines (FSMs) 734. A transaction translator 736 is coupled to routing logic 744 and functions to segregate low-speed and full-speed traffic. A hub repeater 738 transmits USB traffic, via routing logic 744, from upstream port 728 to respective ones of a plurality of remote device switches 746, 748 and 750, and vice versa. Each of remote device switches 746, 748 and 750 is coupled to a downstream port 730, 731, 732, respectively. Hub state machines 740 are FSMs. An augmented hub controller 742, which is coupled to and controls remote device switches 746, 748 and 750, performs conventional USB hub controller functions as well as additional functions in support of remote USB devices.

Figure 7C:
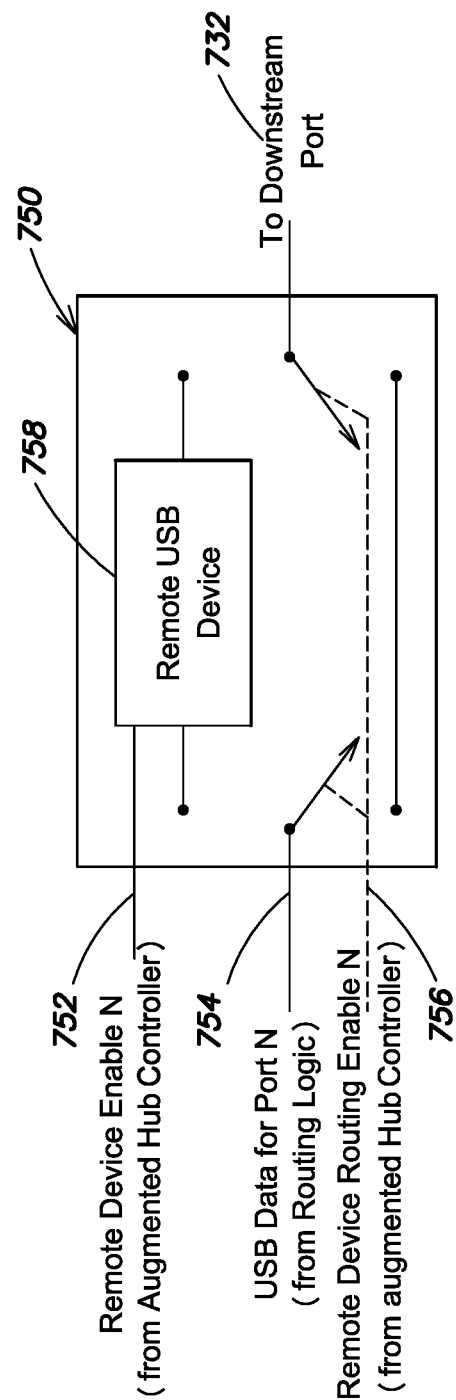
FIG. 7C is a detailed block diagram of a remote USB device switch shown in FIG. 7B.

FIG. 7C is a more detailed block diagram of remote device switch 750 shown in FIG. 7B. A remote device enable signal, which is generated by augmented hub controller 742, is received at an input 752. USB data destined for downstream port 732, which is coupled to remote device switch 750, is received from routing logic 744 at an input 754. A remote device routing enable signal, which is generated by augmented hub controller 742, is received at an input 756. Remote device routing enable signal causes USB data received at input 754 to either pass to remote USB device 758 or to pass to downstream port 732.

Figure 8:
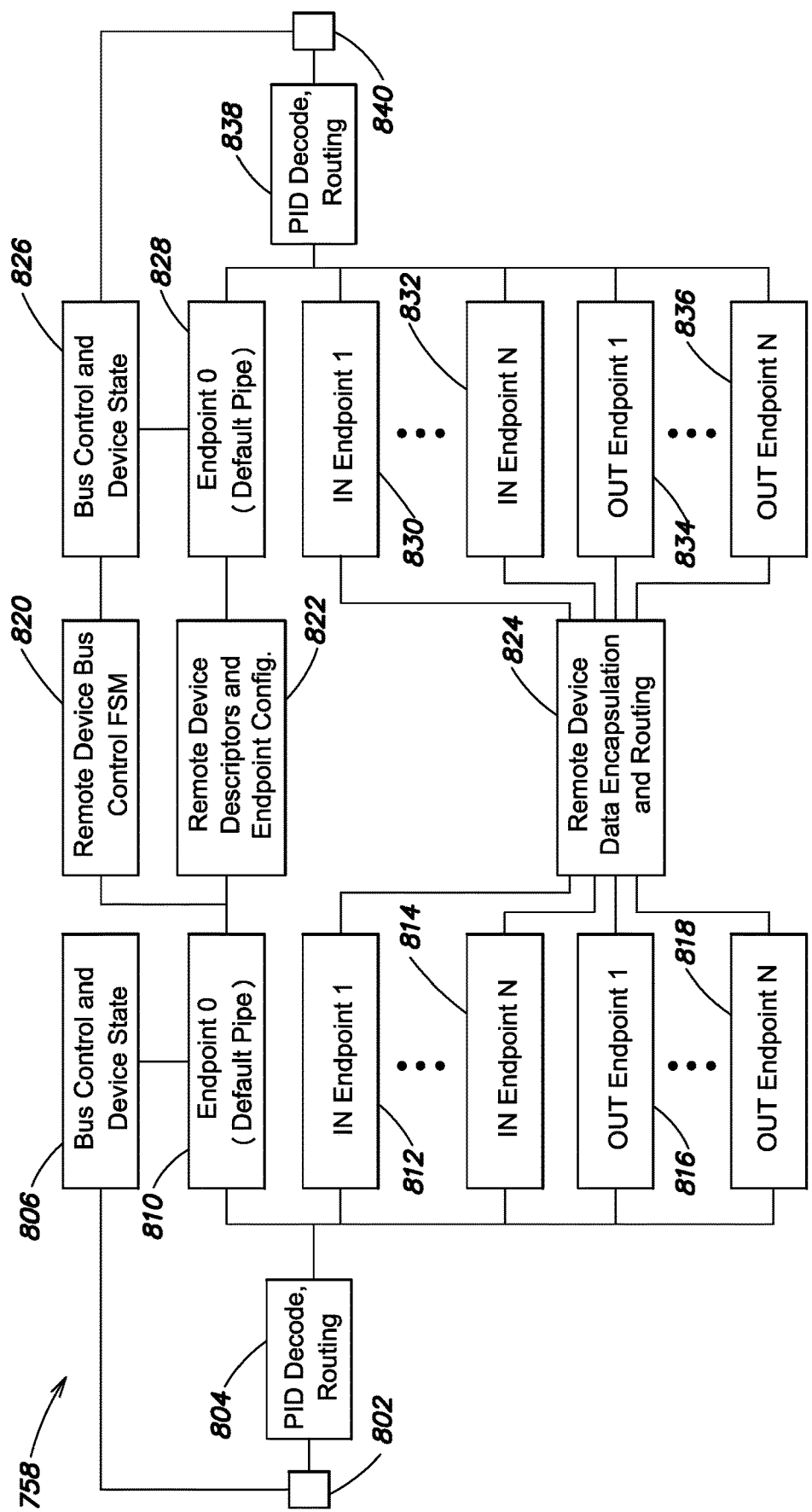
FIG. 8 is a block diagram of the remote USB device supported by the enhanced USB hub shown in FIG. 7A.
Figure 9A:
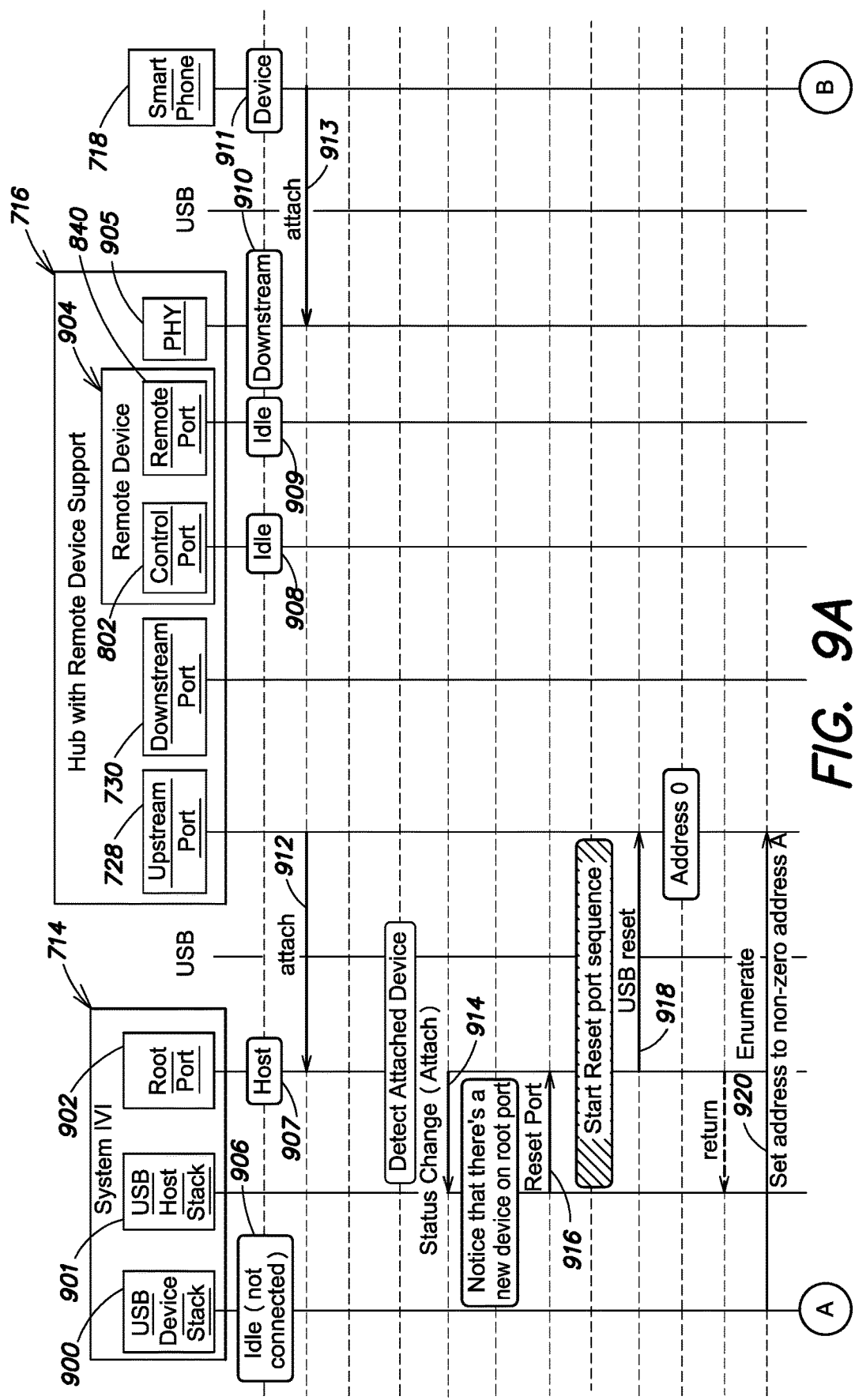
FIGS. 9A-9H are message flow diagrams of a protocol by which an initial USB device may switch roles to become a USB host that controls a remote USB device supported by the enhanced USB hub shown in FIG. 7A.
Figure 9B:
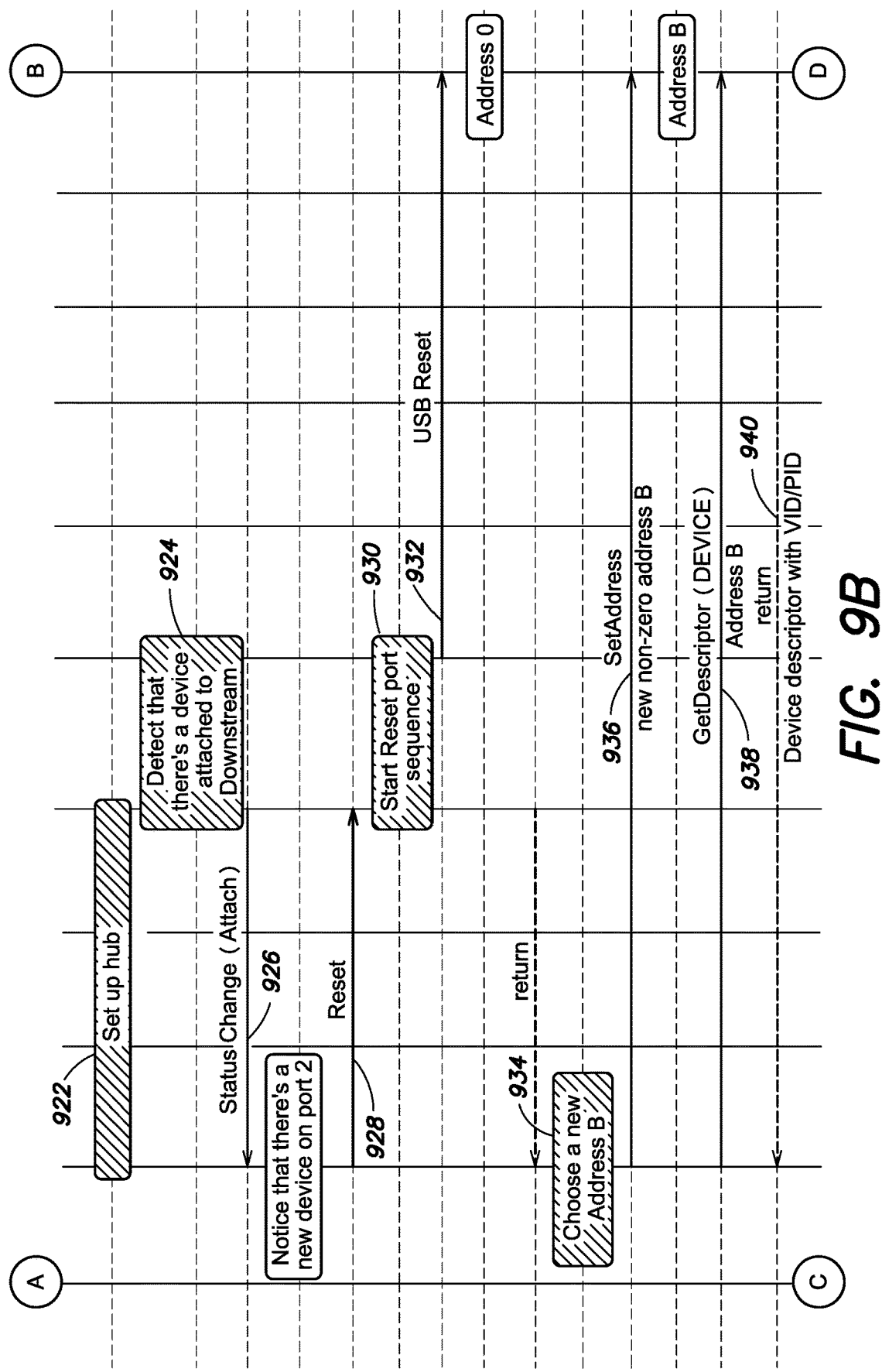
Figure 9C:
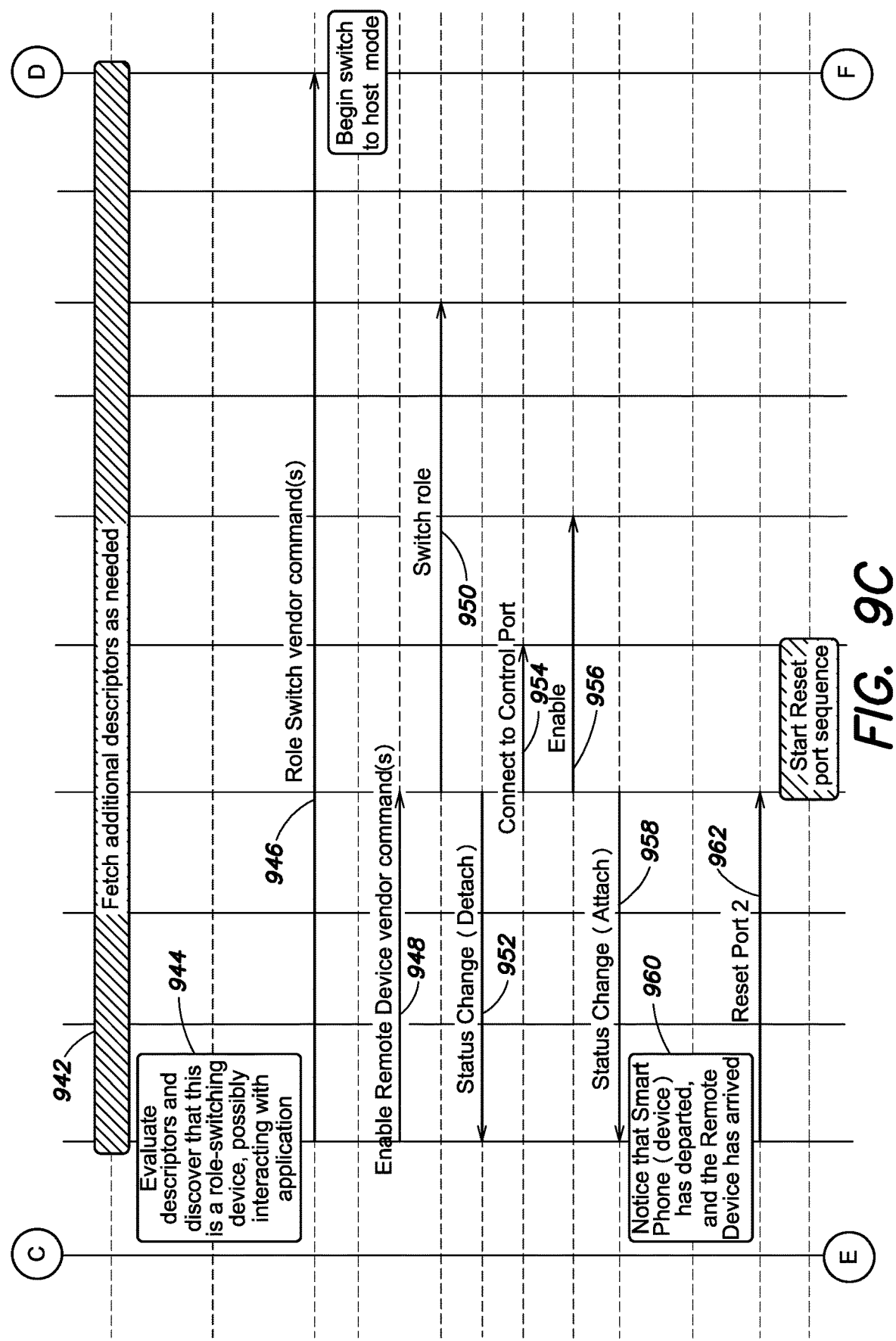
Figure 9D:
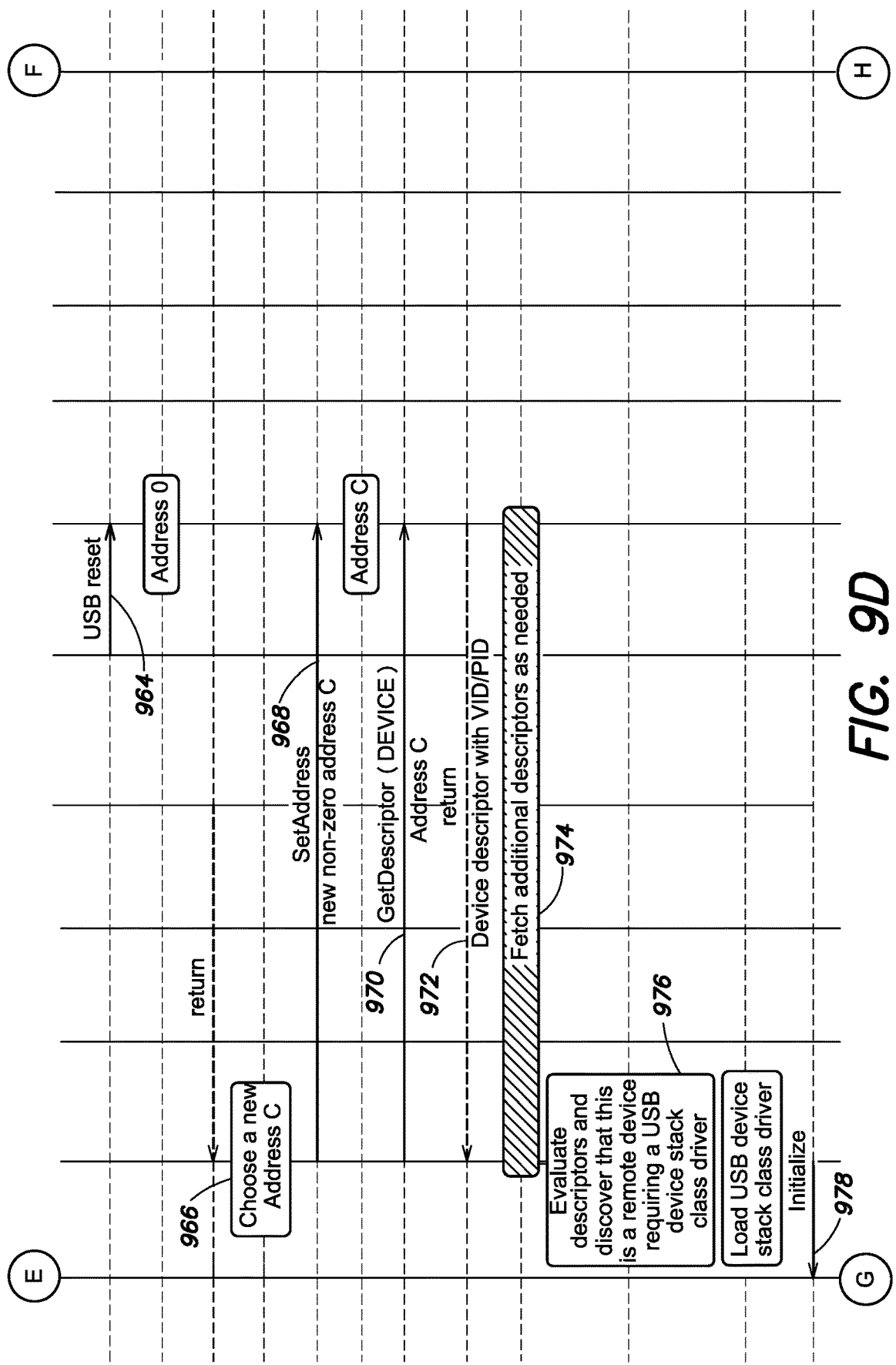
Figure 9E:
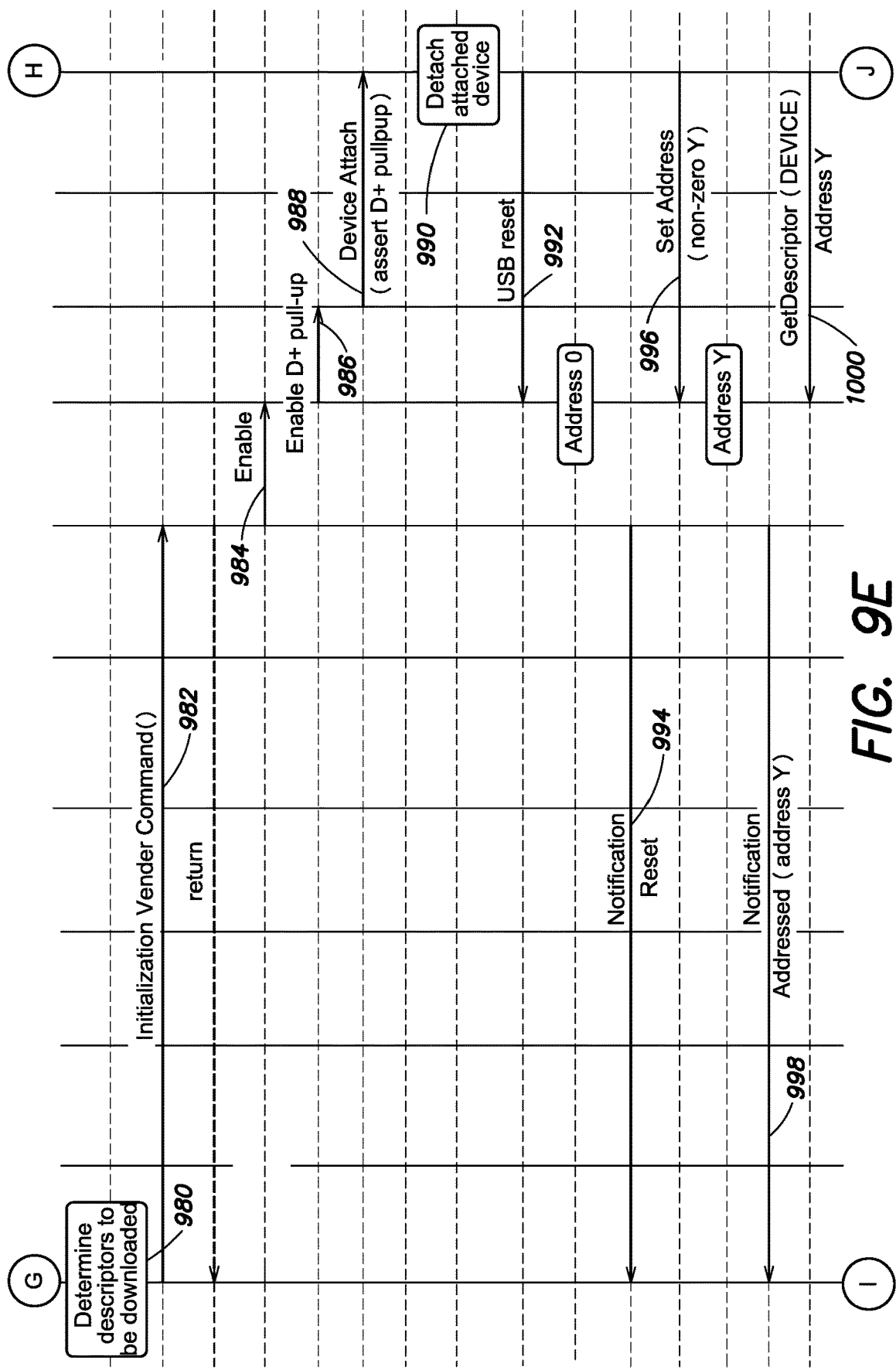
Figure 9F:
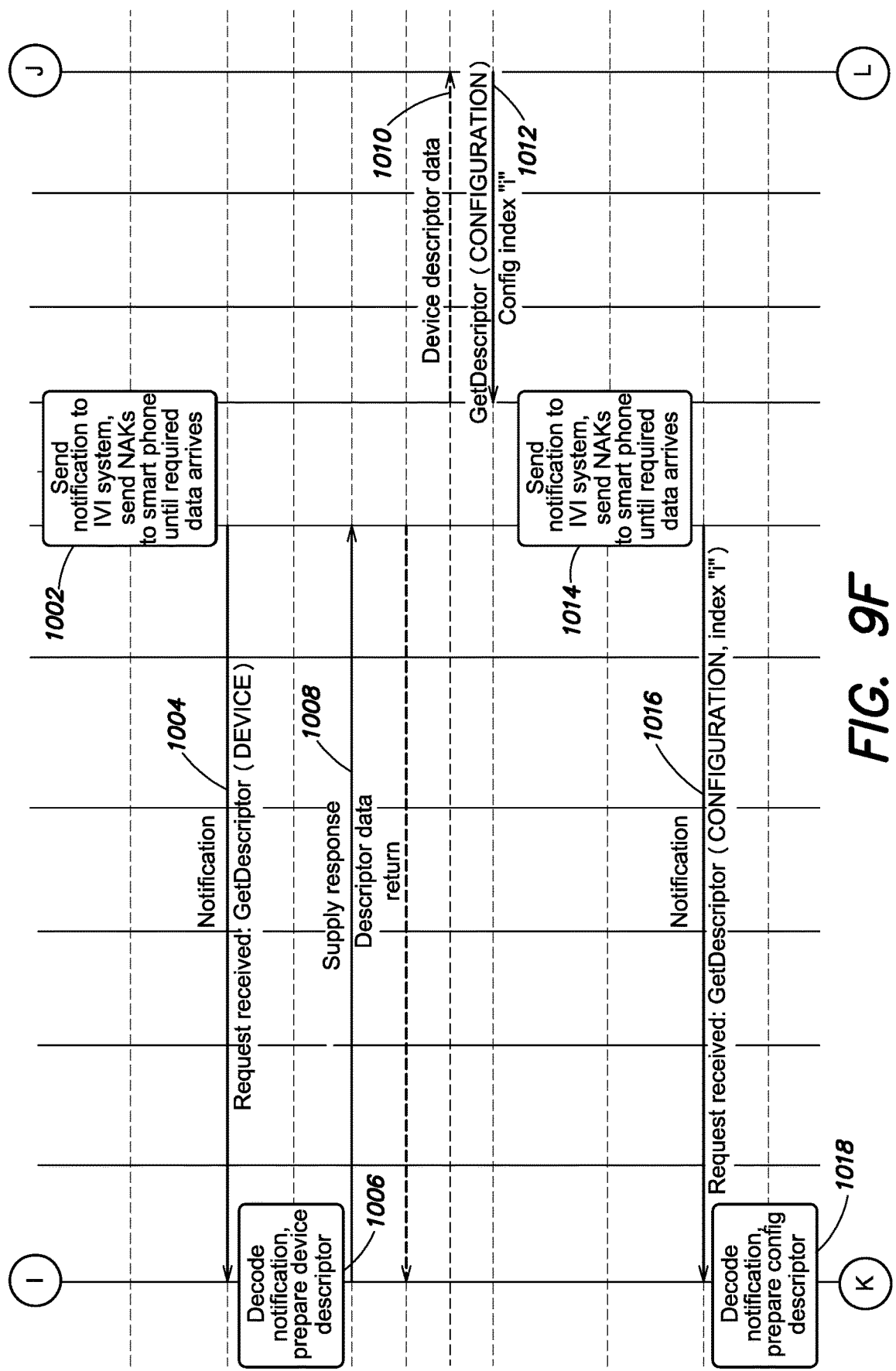
Figure 9G:
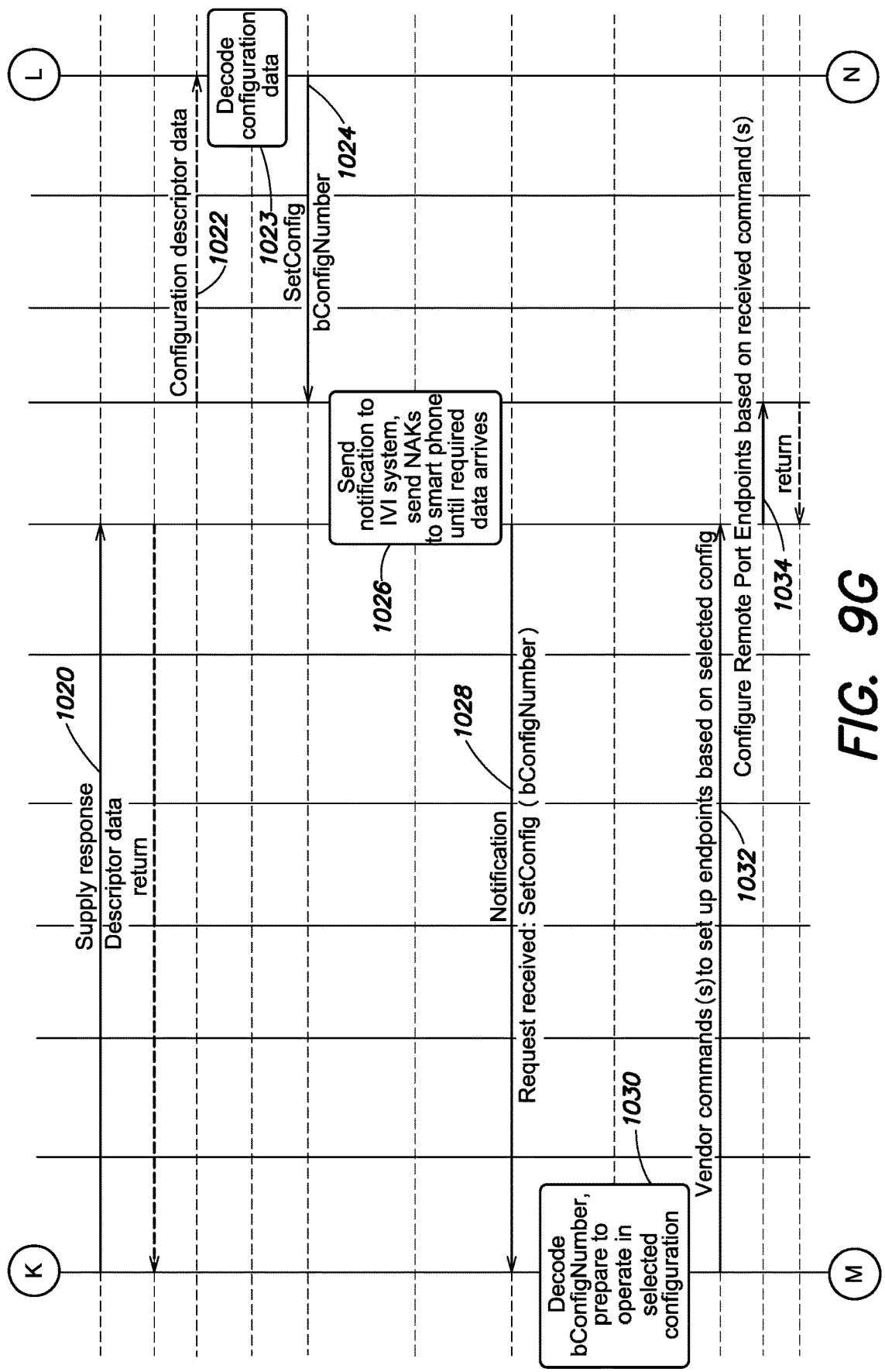
Figure 9H:
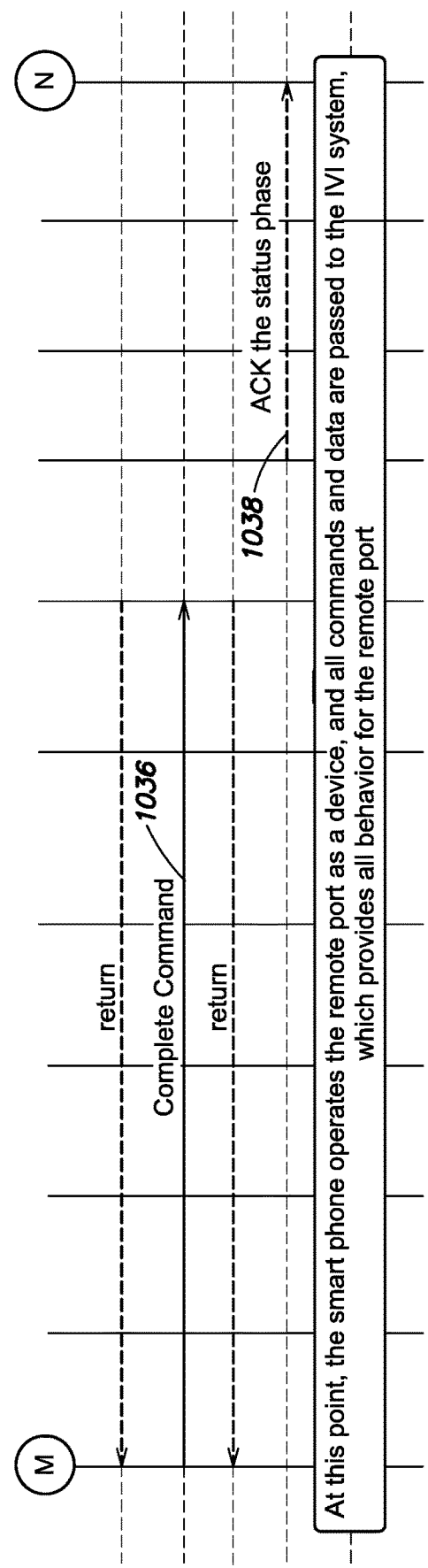

FIG. 8 is a block diagram of the remote USB device 758 shown in FIG. 7C. A control port 802 passes information to a product identification (PID) decode and routing process 804 as well as bus control and device state process 806. Based on a decoded PID, process 804 routes received information to an appropriate one of default endpoint 810, IN endpoints 812, 814, or OUT endpoints 816, 818. IN endpoints 812, 814 and OUT endpoints 816, 818 are coupled to a remote device data encapsulation and routing process 824. Default endpoint 810 is coupled to a remote device bus control FSM 820 and a remote device descriptors and endpoint configuration process 822.

A remote port 840, which is normally in communication with remote USB device 718 (FIG. 7A), passes information to a PID decode and routing process 838, which in turn routes received information to one of default endpoint 828, IN endpoints 830, 832, or OUT endpoints 834, 836. IN endpoints 830, 832 and OUT endpoints 834, 836 are coupled to remote device data encapsulation and routing process 824. Default endpoint 828 is coupled to a bus control and device state process 826 and remote device descriptors and endpoint configuration process 822. Bus control and device state process 826 is also coupled to remote device bus and control FSM 820.

FIGS. 9A-9H show an example of protocol for implementing role switching among initial USB host 714, remote device support hub 716, and remote USB device 718. Similar to the examples described above, in FIGS. 9A-9H an IVI system represents initial USB host 714, and a smartphone represents initial USB device 718. Remote device support hub 716 includes upstream port 728, downstream port 730, remote device 904 (which includes control port 802 and remote port 840) and PHY 905. As the protocol begins, a USB device stack 900 within initial USB host 714 is in an idle (not connected) state 906. Root port 902 of initial USB host 714 is in a state 907 to act as a USB host. Control port 802 is configured in an idle state 908, while remote port 840 is configured in an idle state 909. PHY 905 is configured in a downstream state 910. Initial USB device 718 is in a state 911 to act as a device.

An attach message 912 is sent from upstream port 728 to root port 902. Contemporaneously, an attach message 913 is sent from remote USB device 718 to PHY 905. Root port 902 detects the presence of an attached device (e.g., remote device support hub 716) and sends a status change (attach) message 914 to USB host stack 901. USB host stack 901 notices that a new device is attached to root port 902 and responds by sending a reset port message 916 to root port 902. In turn, root port 902 sends a USB reset message 918 to upstream port 728 which causes address 0 to be assigned to upstream port 728. Subsequently, USB host stack 901 sends an enumerate message 920 to upstream port 728 which causes a non-zero address A to be assigned to that port. This followed by setup 922 of remote device support hub 716.

Next, remote device support hub 716 detects 924 that a device is attached to downstream port 730. Upstream port 926 sends a status change (attach) message 926 to USB host stack 901. USB host stack 901 notices that a new device is attached to downstream port 730 and sends a reset message 928 to upstream port 728 which starts a reset port sequence 930. Subsequently, downstream port 730 sends a USB reset message 932 to remote USB device 718 which causes address 0 to be assigned to device 718. USB host stack 901 then chooses 934 a non-zero address B and assigns it to remote USB device 718 by sending a set address message 936. USB host stack 901 then sends a get descriptor (device) message 938 to remote USB device 718, which responds by returning 940 device descriptor information along with vendor identification (VID) and product identification (PID). If additional descriptors are needed by USB host stack 901 they may be obtained at step 942.

At step 944, USB host stack 901 evaluates the descriptors received from remote USB device 718 and determines that role-switching is possible. Accordingly, USB host stack 901 sends a role switch (vendor specific) message 946 to remote USB device 718 which begins to switch roles. USB host stack 901 next sends an enable remote device (vendor specific) message 948 to upstream port 728 which responds by sending a switch role message 950 to PHY 905. Upstream port 728 sends a status change (detach) message 952 to USB host stack 901, and then sends a connect to control port message 954 to downstream port 730. Upstream port 728 sends an enable message 956 to control port 802, then sends a status change (attach) message 958 to USB host stack 901. At 960, USB host stack 901 notices that initial USB device 718 has departed and remote device 904 has arrived. USB host stack 901 responds by sending a reset port message 962 to upstream port 728, which in turn starts a reset port sequence. Downstream port 730 sends a USB reset message 964 to control port 802 which causes address 0 to be assigned to control port 802.

Next, at step 966, USB host stack 901 chooses a new non-zero address C for control port 802 and sends a set address message 968 to effect the address change. USB host stack 901 then sends a get descriptor (device) message 970 to control port 802 which returns 972 device descriptors with VID/PID. If needed additional device descriptors are fetched at step 974. At step 976, USB host stack 901 evaluates the device descriptors, determines that remote device 904 requires a USB device stack class driver and loads the driver. USB host stack 901 then sends an initialize message 978 to USB device stack 900 which, at step 980, determines the device descriptors that need to be downloaded. USB device stack 900 then sends an initialization vendor command 982 to control port 802 which, in turn, sends an enable message 984 to remote port 840. Remote port 840 responds by sending an enable D+ pullup message 986 to PHY 905 which responds by sending a device attach (assert D+ pullup) message 988 to initial USB device 718. At step 990, initial USB device 718 detects an attached device and responds by sending a USB reset message 992 to remote port 840 which resets that port's address to 0. Subsequently, control port 802 sends a notification reset message 994 to USB device stack 900.

Initial USB device 718 sends a set address message 996 to remote port 840 which sets that port's address to a non-zero address Y. Control port 802 then sends a notification addressed (address Y) message 998 to USB device stack 900. This is followed by initial USB device 718 sending a get descriptor (device) message 1000 to remote port 840. Remote device 904 responds at 1002 by sending a notification message 1004 to USB device stack 900 and sending negative acknowledgements (NAKs) to initial USB device 718 until required data arrives. Next, at step 1006, USB device stack 900 decodes the notification message it received and prepares device descriptor information. USB device stack 900 then sends a response message 1008 to control port 802 which is accompanied by device descriptor data. In turn, remote port 840 sends device descriptor data 1010 to initial USB device 718 which responds by sending a get descriptor (configuration) message 1012 to remote port 840.

Remote device 904 responds at 1014 by sending a notification message 1016 to USB device stack 900 and sending NAKs to initial USB device 718 until required data arrives from the USB device stack. Next, at step 1018, USB device stack 900 decodes the notification message it received and prepares configuration descriptor information. USB device stack 900 then sends a response message 1020 to control port 802 which is accompanied by configuration descriptor data. In turn, remote port 840 sends configuration descriptor data 1022 to initial USB device 718 which decodes 1023 the data. Initial USB device 718 then sends a set configuration message 1024 to remote port 840. Remote device 904 responds at 1026 by sending a notification message 1028 to USB device stack 900 and sending NAKs to initial USB device 718 until required data arrives from the USB device stack.

At 1030, USB device stack 900 decodes the configuration notification it received and prepares to operate in the selected configuration. Next, USB device stack 900 sends a message 1032 to control port 802 to set up endpoints based on the selected configuration. Control port 802 responds by configuring endpoints 1034 for remote port 840 based on message 1032. USB device stack 900 sends a complete command message 1036 to control port 802. Remote port 840 then sends a status acknowledgement 1038 to what is now role-switched USB host 718 operating remote port 840 as a USB device. All commands and data from role-switched USB host 718 are passed through remote device 840 to role-switched USB device 714.

The protocol shown in FIGS. 9A-9H may also be used to support multiple remote devices within remote device support hub 716. In such a topology, role-switched USB device 714 may assign an unique device instance identification to each remote device 904 so that traffic received from each role-switched host 718 may be easily tracked.

The protocol shown in FIGS. 9A-9H may also be used in a topology in which one or more role-switching hubs, such as role-switching hub 530 described above, are present. For example, in the topology of FIG. 7A, if one or more role-switching hubs 530 are present between downstream port 730 and initial USB device 718, the protocol shown in FIGS. 6A-6F could be combined with the protocol shown in FIGS. 9A-9H to detect such role-switching hubs and recursively switch the role of each hub beginning with the one closest to initial USB device 550.

The foregoing description has been directed to particular embodiments of this invention. It will be apparent, however, that other variations and modifications may be made to the described embodiments, with the attainment of some or all of their advantages. Specifically, it should be noted that embodiments of the present invention may be implemented in connection with various USB host systems and are not limited to host systems that rely on a particular operating system. Also, the procedures, processes and/or modules described herein may be implemented in hardware, software, embodied as a computer-readable medium having program instructions, firmware, or a combination thereof.

What is claimed is:

1. A Universal Serial Bus (USB) hub comprising:
    a first port configured as a first USB upstream port configured to receive downstream data traffic from a USB host towards a first remote USB device;
    a second port configured as a first USB downstream port configured to receive only upstream data traffic from the first remote USB device towards the USB host; and
    a hub controller configured to:
    establish a first connection on the first port with the USB host;
    establish a second connection on the second port with a first USB device, wherein the first port communicates with the second port bypassing the first remote USB device; and
    in response to receiving on the first port a USB enable remote device command, reconfigure the second port as a USB second upstream port and provide routing of communication between the first port and the reconfigured second port via the first remote USB device.

2. The USB hub of claim 1 further comprising: a third port configured as a second USB downstream port; a second USB remote device; and the hub controller further configured to: establish a third connection on the third port with a second USB device, wherein the first port communicates with the third port bypassing the second remote USB device; reconfigure the third port as a third USB upstream port; and provide routing of communication between the first port and the reconfigured third port via the second remote USB device.

3. The USB hub of claim 1 wherein the first USB device is a smartphone.

4. The USB hub of claim 1 wherein the second port includes a USB type C receptacle.

5. The USB hub of claim 1 wherein the first USB device comprises one of a digital camera, a MP3 player, and mass storage.

6. The USB hub of claim 1 wherein the first port is connected to an in-vehicle infotainment (IVI) system.

7. The USB hub of claim 1 wherein a USB role switch message is passed via the second port to the first USB device.

8. The USB hub of claim 1 wherein the hub controller is further coupled to a transaction translator configured to segregate low-speed and full-speed traffic between the first port and the reconfigured second port.

9. The USB hub of claim 1 wherein the USB enable remote device command includes a vendor specific message.

10. The USB hub of claim 1 wherein the first remote USB device sends negative acknowledgements (NAKs) to the first USB device operating as a role-switched USB host until data arrives from the USB host.

11. The USB hub of claim 2 wherein the first USB device and the second USB device are smartphones.

12. The USB hub of claim 2 further comprising a hub repeater coupled to the hub controller and configured for communication between the first port to respective ones of the reconfigured second port and the reconfigured third port.

13. A method comprising:
    configuring a first port of a Universal Serial Bus (USB) hub as a first USB upstream port configured to receive downstream data traffic from a USB host towards a first remote USB device;

configuring a second port of the USB hub as a first USB downstream port configured to receive only upstream data traffic from the first remote USB device towards the USB host; and configuring a hub controller to:

establish a first connection on the first port with the USB host;

establish a second connection on the second port with the first USB device, wherein the first port communicates with the second port bypassing a first remote USB device; and in response to receiving on the first port a USB enable remote device command, reconfigure the second port as a second USB upstream port and provide routing of communication between the first port and the reconfigured second port via the first remote USB device.

14. The method of claim 13 further comprising: configuring a third port of the USB hub as a second USB downstream port; and configuring the hub controller to: establish a third connection on the third port with a second USB device, wherein the first port communicates with the third port bypassing a second remote USB device; reconfigure the third port as a third USB upstream port; and provide routing of communication between the first port and the reconfigured third port via the second remote USB device.

15. The method of claim 13 wherein the first USB device is a smartphone.

16. The method of claim 13 wherein the second port includes a USB type C receptacle.

17. The method of claim 13 wherein the first USB device comprises one of a digital camera, a MP3 player, and mass storage.

18. The method of claim 13 wherein the first port is connected to an in-vehicle infotainment (IVI) system.

19. The method of claim 13 wherein a USB role switch message is passed via the second port to the first USB device.

20. The method claim 13 wherein the USB enable remote device command includes a vendor specific message.

* * * * *